United States Patent [19]

Ilenda et al.

[11] Patent Number: 4,957,974

[45] Date of Patent: Sep. 18, 1990

[54] GRAFT COPOLYMERS AND BLENDS THEREOF WITH POLYOLEFINS

[75] Inventors: Casmir S. Ilenda, Hulmeville; Newman Bortnick, Oreland, both of Pa.; Roger K. Graham, Moorestown, N.J.; William J. Work, Huntingdon Valley, Pa.

[73] Assignee: Rohm and Haas Company, Philadelphia, Pa.

[21] Appl. No.: 315,501

[22] Filed: Mar. 1, 1989

Related U.S. Application Data

[63] Continuation-in-part of Ser. No. 174,648, Mar. 29, 1988, abandoned.

[51] Int. Cl.$^5$ ..................... C08F 255/02; C08F 267/02
[52] U.S. Cl. ...................................... 525/301; 525/309
[58] Field of Search ............................... 525/301, 309

[56] References Cited

U.S. PATENT DOCUMENTS 4,595,726  6/1986  Klosiewicz ..................... 525/309

FOREIGN PATENT DOCUMENTS 234314  10/1959  Australia ........................ 525/309
4642622  12/1971  Japan ............................. 525/309

*Primary Examiner*—John C. Bleutge
*Assistant Examiner*—Vasu S. Jagannathan
*Attorney, Agent, or Firm*—John E. Taylor, III; Jordan J. Driks

[57] ABSTRACT

A novel graft copolymer capable of imparting to a polyolefin when blended therewith high tensile modulus and high sag resistance without increasing melt viscosity, and a method of making the same. The graft copolymer is a polyolefin having a relatively high weight-average molecular weight methacrylate polymer grafted thereto. The graft copolymer is formed by dissolving or swelling a non-polar polyolefin in an inert hydrocarbon solvent, heating to dissolve the polyolefin, and while stirring the mixture, adding a methacrylate monomer, together with an initiator to produce a constant, low concentration of radicals, to form a graft copolymer with a high molecular weight polymer chain covalently bonded or grafted to the polyolefin backbone. The graft copolymer can be separated from the solvent, isolated by volatilizing the solvent, for example in a devolatilizing extruder, and extruded into a desired shape such as a sheet, tube or the like. This graft copolymer can be blended with a polyolefin matrix. The blend exhibits improved physical properties in the melt, upon cooling, and in the solid state, and is useful in cast and oriented films, solid extruded rod and profile, foamed rod, profile and sheet, blown bottles and the like. The graft copolymer further improves compatibility in a wide range of polymer blends.

8 Claims, No Drawings

GRAFT COPOLYMERS AND BLENDS THEREOF WITH POLYOLEFINS

This is a continuation-in-part of Ser. No. 174,648, filed Mar. 29, 1988 and now abandoned.

FIELD OF THE INVENTION

This invention relates broadly to a novel graft copolymer capable of imparting to a polyolefin, when blended therewith, high tensile modulus and high resistance to sagging without increasing melt viscosity, and to a method of making the same.

More particularly, the invention relates to a polymerized olefin having grafted thereto, by covalent bonding, a polymeric methacrylate chain of relatively high molecular weight. The methacrylate chain has a weight average molecular weight ($M_w$) of at least 20,000 and advantageously between about 30,000 and 150,000.

In the method of manufacturing the grafted copolymer, a non-polar polyolefin, preferably polypropylene or polyethylene, is introduced into an inert hydrocarbon solvent which dissolves (or swells) the polyolefin, by heating to a temperature at which the polyolefin is dissolved. While agitating the solution, methyl methacrylate (MMA) monomer, together with an initiator which generates a constant, low radical flux concentration sufficient to initiate polymerization of the monomer at the temperature of the solution and the formation of the covalent bond, is gradually added. The polyolefin with a side-chain grafted thereto is thereafter separated from the solvent by volatilizing the solvent, preferably in a devolatilizing extruder. The graft polymer is then blended with a suitable polyolefin such as polypropylene or polyethylene, and extruded into a desired shape.

BACKGROUND OF THE INVENTION

Non-polar polyolefins, especially polypropylene and polyethylene and mixtures in various low-density, high-density, and linear low-density form, are major articles of commerce for a wide variety of uses. Nevertheless, there exist specialty needs for which the marketplace has not provided a satisfactory answer. Among these are to overcome the difficulty of thermoforming and processing of the polyolefin, especially unfilled, in a molten or semi-molten form (substantially above its melting point); the polymer tends to sag readily under its own weight because it exhibits an undesirably low stiffness, and to form shapes of grossly non-uniform thicknesses upon thermoforming. Attempts to correct same by increasing the molecular weight lead to difficulties in processing the higher molecular weight polymer not encountered with the lower molecular weight grades.

For the isotactic polymer of butene-1, known also as polybutylene, the low melting point has made difficult the crystallizing of the polymer after processing and obtaining the enhanced performance and handling properties crystallization imparts. Satisfactory nucleators have not appeared in the marketplace.

Means have also been sought to improve the toughness or impact strength of polypropylene, for instance. Use of copolymers or ethylene-propylene rubber modified polypropylene has improved toughness, but at the cost of even lower stiffness values, and lower values of heat distortion resistance. It would be desirable to combine impact performance of the copolymers with stiffness and heat distortion behavior of the homopolymer polypropylene resin.

Grafting of monomers capable of vinyl polymerization, such as styrene, methyl methacrylate, and the like, onto polyolefins such as polyethylene, polypropylene, ethylene-propylene copolymers, and ethylene-propylene-diene terpolymers has been studied almost since the discovery of routes to practical preparation of such backbones. Grafting onto solid polymer by vapor-phase polymerization, by reaction in an extruder, by peroxidation of the olefinic backbone, and grafting onto pendant double bonds are all routes which have been attempted. There still exists a need for a route which allows for grafts of relatively high molecular weight, with relatively good grafting efficiency (i.e., lowered formation of unattached polymer molecules), freedom from gel, and a practical means for preparing and isolating the graft polymer in an efficient and lower-cost manner.

Blends of two or more polymers have often been made, for example in attempts to combine desirable properties of the individual polymers into the blend, to seek unique properties in the blend, or to produce less costly polymer products by including less expensive or scrap polymers in the blend. Compatible polymers tend to form blends that contain small domains of the individual polymers; in the case of "miscible" polymers these occur at the molecular scale, resulting in properties usually considered characteristic of a single polymer. These may include occurrence of a single glass-transition temperature and optical clarity. Such blends are frequently termed "alloys." Compatible polymers that are not strictly miscible, as described above, nevertheless tend to form blends with properties that approach those of the miscible blends. Such properties as tensile strength, which rely upon adhesion of the domains to one another, tend not to be degraded when compatible polymers are blended.

Unfortunately many polymers are poorly compatible with one another. Poor compatibility cannot necessarily be predicted accurately for a given polymer combination, but in general it may be expected when non-polar polymers are blended with more polar polymers. Poor compatibility in a blend is apparent to those skilled in the art, and often evidences itself in poor tensile strength or other physical properties, especially when compared to the component polymers of the blend. Microscopic evidence of poor compatibility may also be present, in the form of large, poorly adhered domains of one or more polymer components in a matrix of another polymer component of the blend. More than one glass-transition temperature may be observed, and a blend of otherwise transparent polymers may be opaque because the domain sizes are large enough to scatter visible light.

Much research has been directed toward finding ways to increase the compatibility of poorly compatible polymers when blended. Approaches that have been used include adding to the blend polymers which show compatibility with the other, mutually incompatible polymers; such added polymers act as a bridge or interface between the incompatible components, and often decrease domain size. Chlorinated polyethylene has been used as such an additive polymer, especially in blends of polyolefins with other, poorly compatible polymers.

Graft polymers, as of incompatible polymers A onto B, are known to aid in blending polymers A and B. Such graft polymers may also serve to aid in blending other incompatible polymers C and D, where A and C are compatible and B and D are compatible.

What has also been difficult to predict in polymer science is the extent to which such a graft polymer will be effective in enhancing desirable properties of the blend over those of the incompatible blend alone. Consequently, those skilled in the art have had to treat each combination of graft polymer and other component polymers of a given blend as a special case, and determine experimentally whether an improvement in such properties as tensile strength could be obtained by adding a specific graft polymer to a specific blend.

RELEVANT ART

U.S. Pat. No. 4,094,927 describes copolymers of higher alkyl methacrylates with (meth)acrylic acid as melt strength additives, foam stabilizers, and processing aids for polypropylene. Such polymers, however, are not fully compatible with polypropylene and the additive will tend to plate out and foul equipment during such operations as melt calendering.

U.S. Pat. No. 4,409,345 describes polyolefin modified with a polymerizable unsaturated carboxylic ester in affording improved processing of mixtures of polypropylene, high density polyethylene, and finely divided vegetable fibers. The patent appears only to demonstrate reinforcement by the fibers which are bonded to the polyolefin by the graft copolymer. All examples are limited to "grafts" of maleic anhydride or acrylic acid, wherein the material grafted is of a molecular weight corresponding to a small number of monomer units.

South African Patent No. 826,440 describes "improved melt viscosity" (higher melt viscosity under low shear conditions while retaining the low melt viscosity at high shear rheology behavior of the unmodified polypropylene) and improved thermoforming characteristics for blends of polypropylene with certain salts of acid-modified propylene polymers.

U.S. Pat. No. 4,370,450 describes modification of polypropylene with polar vinyl monomers by polymerization in aqueous suspension containing a swelling agent at temperatures above 85° C. with a radical chain initiator having a half-life of at least 2 hours in the temperature range 80°-135° C. The patent does not describe direct solution grafting, stating such yields "only relatively low degrees of grafting". Hydrocarbons are listed as examples of swelling agents.

U.S. Pat. No. 4,161,452 describes only grafts of unsaturated carboxylic acids or anhydrides and esters of (meth)acrylic acid onto ethylene/propylene copolymers in solution in the presence of a freeradical initiator capable of hydrogen abstraction at temperatures between 60° and 220° C. An oil soluble polymer is required.

U.S. Pat. No. 4,595,726 describes graft copolymers of $C_2$-$C_6$ alkyl methacrylates onto polypropylene via a solvent-free vapor-phase polymerization wherein the molecular weight of the graft and the number of grafted chains are controlled to yield the desired (although undefined) length and number of chains for utility in adhesive applications between polypropylene and more polar substrates. The patent discloses that similar grafts can be made from methyl methacrylate, but do not exhibit the desired adhesive properties. The patent requires polymerization below the softening point of polypropylene, which is not defined in their patent, which is known to be lowered by the presence of monomers, and for which no temperature higher than 140° C. is exemplified, and in the absence of solvent. There is no indication or suggestion that a relatively high molecular weight chain is covalently grafted to the polyolefin. Moreover, the radical flux generated appears to be too high to form a high molecular weight, e.g. greater than 20,000, chain.

U.S. Pat. No. 4,692,992 describes grafting at temperatures between 60° and 160° C. while maintaining the olefin polymer dissolved in a solvent which is a mixture of a hydrocarbon and a ketonic solvent, the grafted polymer precipitating upon cooling the reacted mixture below 40° C. Reaction conditions for achieving high molecular weight or the advantage in conducting the reaction in the presence only of a solvent of low chain transfer activity are not disclosed.

U.S. Pat. No. 3,862,265 only describes melting of polyolefins in an extruder, followed by grafting of unsaturated acids to achieve "improved rheology" as defined in South African Patent No. 826440, supra.

U.S. Pat. No. 3,886,227 discloses (but does not exemplify for the esters) grafting of unsaturated acids and esters to form a material useful as a modifying agent for polypropylene. The grafting is conducted in an extruder, and they also disclose that the molecular weight of the backbone polypropylene polymer be lowered by degradation during the grafting process, conducted at a temperature above 200° C. It describes blending with polypropylene and the resulting modification found, such as nucleation, lack of warpage on molding, and the like. Although improvement in heat distortion temperature is noted, there is no disclosure of improved rheological performance at the temperatures required for thermoforming and the like.

Japanese Kokai 59-164347 describes grafts for unsaturated acids or their derivatives (including esters) at very low graft levels (10-5 to 10-8 g equivalents per gram of polyolefin), blends of the grafts with polyolefins, and their use in affecting surface tension in the molten state of the polyolefin while not affecting high-shear viscosity, making the blends useful in, e.g. blow molding of bottles.

Kallitis et al., *Eur. Polymer J.*, 27, 117 (1987) describes ethylene-propylene polymers as nucleating agents for polybutylene. They do not describe or suggest the utility of the polypropylene/methacrylic grafts of this invention.

Reike and Moore, in U.S. Pat. No. 2,987,501, disclose grafts of polymers of vinyl monomers onto polyethylene or polypropylene by oxidizing the polyolefin with fuming nitric acid or nitrogen tetroxide, followed by heating the activated polyolefin with the vinyl monomer. The reference exemplifies grafting methyl methacrylate onto polyethylene and polypropylene.

Japanese Kokai 223250/87 discloses compatibilizing a polyolefin and a polyamide using a reaction product of an unsaturated carboxylic acid or its derivative grafted onto a mixture of polyolefin and polyamide, that is, the reaction product is formed in the presence of a mixture of two or more polymers. The amount of acid or derivative reacted with the trunk polymers is less than 10%, and it is clear from the only examples present, which utilize unsaturated acids which do not homopolymerize, that what is attached or grafted are low-molecular-weight moieties,. They disclose reaction conditions, including relatively low levels of unsaturated acid and relatively high levels of peroxide, which would lead one away from achieving the molecular weights of the grafted chains disclosed below as part of the present invention. A particular modifier disclosed by this reference, formed by reacting two non-polymerizable acids with a mixture of four trunk polymers, affects the compatibility of the polyamide and polyolefin. However, the comparative data suggest that a reaction of the acids onto polypropylene alone is not an effective compatibilizer for the two resins, and shows that graft polymers of low levels of low molecular unsaturated acids or derivatives are not effective in compatibilizing polyamides with polyolefins.

Japanese Kokai 86040/87 directed to polymer adhesives, discloses an olefin polymer adhesive modified with a carboxylic or carboxylic anhydride group, further reacted with a polyolefin having alcohol functionality, and still further reacted with an aromatic acid halide.

Boutevin et al., in *Angewandte Makromolekular Chemie*, Vol. 162, page 175 (1988), disclose the preparation of a graft polymer of poly(methyl methacrylate) onto a polyethylene trunk by ozonolysis of a low-density polyethylene followed by heating the activated polyethylene in the presence of methyl methacrylate. They disclose grafts of methyl methacrylate having a number-average molecular weight up to 21400, and the use of such grafts as polymeric emulsifiers or compatibilizers for mixtures of low-density polyethylene and poly(vinyl chloride). They report that the compatibilized mixture has a distinct increase in the stress required to break it, and a decrease in the domain sizes in the blend. They also report appreciable degradation of the polyethylene molecular weight when it is ozonized prior to grafting. This reference does not deal with higher molecular weights, nor does it provide any indication that the graft polymer might be effective in reducing sag of a polyolefin matrix polymer or otherwise imparting desirable rheological effects to a polymer.

Thus, the art has described means for preparing grafts of methyl methacrylate homo- and copolymers upon polyolefin substrates, but has not recognized the advantages of the polymerization process herein described for a rapid, efficient production of novel high molecular weight grafts without gel and with ease of product isolation. The art teaches that certain grafts may be blended with polyolefins, but has not recognized the unexpected utility of the novel graft polymers of this invention as having positive effects on both low-shear melt and solid-state properties, especially with little or no effect on the high-shear performance. The art also has not recognized or identified the positive effects on sag resistance imparted by the present grafts.

It is thus an object of this invention to provide an improved process for the manufacture of novel graft polymers of methacrylic esters onto polyolefin substrates. Another object is to provide graft copolymers of at least one chain of methacrylate polymer of relatively high molecular weight, i.e. at least 20,000, onto a polyolefin homo- or copolymer substrate. Yet another object is to provide such graft copolymers which serve as compatibilizing agents for blends of polymers which are otherwise poorly compatible. It is a further object to provide blends of the graft copolymer with a polyolefin matrix which exhibit improved physical performance in the melt, upon cooling, and in the sold state.

Further objects and advantages of this invention will appear as this specification progresses.

SUMMARY OF THE INVENTION

Broadly, the aforesaid objects and advantages are accomplished by grafting onto a non-polar polyolefin trunk in solution, at least one chain which is of a polymer having a weight average molecular weight greater than about 20,000, and present in a weight ratio with the polyolefin of from about 1:9 to 4:1. The graft polymer is derived from at least about 80% of a monomer of a methacrylic ester of the formula $CH_2=C(CH_3)COOR$, where R may be alkyl, aryl, substituted or unsubstituted, and less than 20%, based on the total monomer weight, of an acrylic or styrenic monomer copolymerizable with the methacrylic ester. This is accomplished by adding the methacrylate monomers to a solution of the polyolefin together with an initiator which generates a constant, low radical concentration, or radical "flux", at the solution temperature. These radicals initiate polymerization of the monomer and cause formation of a covalent bond with the trunk.

The resulting copolymer product, hereinafter referred to as concentrate, may be blended with polyolefin either as a result of the manner by which it is made, or after it is made. It may be extruded into a desired shape either directly, or after pelletization. In either case, the resulting blended product exhibits a relatively high tensile modulus and high sag resistance without an increase in melt viscosity, as compared with similar ungrafted polymers, viz: polyolefins without a high molecular weight chain or chains covalently bonded thereto.

The concentrate may also be blended with other polymers than polyolefins, and particularly with mixtures of two or more polymers which are poorly compatible with one another, and which may or may not include polyolefins, to improve the compatibility of the resulting mixture.

The invention also relates to a process of making such a copolymer having a relatively high weight-average molecular weight ($M_w$) polymer chain. Briefly, the process according to this invention involves dissolving or swelling the polyolefin in an inert hydrocarbon solvent, and heating to dissolve the polyolefin, i.e. at least about 140° C. While agitating the solution, a monomer is introduced, together with an initiator which generates a constant, low radical flux at the temperature of the solution; the radicals initiate polymerization of the monomer and formation of a covalent bond therewith on the polyolefin trunk. The reacted mixture may be allowed to solidify by removal of the solvent. The resultant product, the concentrate, consists of the polyolefin with the chain grafted thereto, unreacted polymer, i.e. polyolefin without the chain, and ungrafted methacrylic ester polymer. It may be pelletized, blended with another polyolefin and extruded into desired shape. Alternatively the reaction mixture may be extruded directly in a devolatilizing extruder to volatilize the solvent and residual monomer, and thereafter blended with a polyolefin and extruded to form article in such form as sheets, tubes and the like.

DETAILED DESCRIPTION

In the following, LDPE is low-density polyethylene, usually branched, of density of about 0.91 to about 0.94 g/cc; HDPE is high-density polyethylene of a density above about 0.95 g/cc; LLPDE is linear low-density polyethylene of density about 0.91 to about 0.95 g/cc; EPDM includes rubber terpolymers of ethylene, propylene, and a non-conjugated diene monomer, such as 1,4-hexadiene or ethylidenenorbornene.

The term "polar substrate" or "non-polar" polymer, as used herein, is difficult to define in quantitative terms. By "non-polar" is meant polymers which are predominantly formed from monomer units of mono- or di-olefins. "Polar", as generally understood in the polymer art, would refer to monomers or polymers which contain an oxygen, nitrogen, or sulfur-containing functionality. Thus, methyl methacrylate, acrylonitrile, and vinyl phenyl sulfone are "polar" monomers, whereas polypropylene is a "non-polar" polymer.

The polymers to be modified in the grafting process include the non-polar olefin polymers and copolymers. Included are polypropylene, polyethylene (HDPE, LDPE, and LLDPE), polybutylene, ethylene-propylene copolymers at all ratios of ethylene and propylene, EPDM terpolymers at all ratios of ethylene and propylene and with diene monomer contents up to 10%, poly(1-butene), polymethylpentene, ethylene-vinyl acetate copolymers with vinyl acetate contents up to 25%, ethylene-methyl acrylate copolymers, ethylene-methyl methacrylate copolymers, and ethylene-ethyl acrylate copolymers. Also included are mixtures of these polymers in all ratios.

Usable graft copolymers include those with ratios of polyolefin:acrylic polymer or copolymer that vary from 20:80 to 80:20.

The molecular weight of the polyolefin polymer which forms the trunk of the graft copolymer should be high enough to give a large amount of non-polar polymer when grafted, but low enough so that most of the graft copolymer has one acrylic polymer chain grafted to each polyolefin trunk chain. The trunk may have a molecular weight between about 50,000 and 1,000,000. The trunk may also have a molecular weight of about 100,000 to 400,000. A polyolefin trunk having a molecular weight of about 200,000–800,000 $M_w$ is especially preferred, but polyolefins having a molecular weight of about 50,000–200,000 can be used with some beneficial effect. In general, a graft copolymer imparts greater meltrheology improvement to a high-molecular-weight polyolefin. This is especially true when the polyolefin trunk of the graft copolymer is of relatively low molecular weight.

Melt flow rate (mfr) is well known to correlate well with weight-average molecular weight. The preferred range of mfr values for the polyolefin trunks used in preparing the graft copolymers of the present invention are from about 20 to about 0.6 g/10 minutes as measured by ASTM Standard Method D-1238.

The preferred monomer is methyl methacrylate. As much as 100% of this, or of other 2 to 4 carbon alkyl methacrylates, can be used. Up to 20% of high alkyl, such as dodecyl and the like, aryl, such as phenyl and the like, alkaryl, and such as benzyl and the like, and/or cycloalkyl, such as cyclohexyl and the like, methacrylates can be used. In addition, up to 20% (preferably less than 10%) of the following monomers can be incorporated with the methacrylate esters which form the major portion of the monomer: methacrylic acid, methacrylamide, hydroxyethyl methacrylate, hydroxypropyl methacrylate, alkoxyalkyl methacrylates, such as ethoxyethyl methacrylate and the like, alkylthioalkyl methacrylates, such as ethylthioethyl methacrylate and the like, methacrylamide, t-butylaminoethyl methacrylate, dimethylaminoethyl methacrylate, dimethylaminopropyl methacrylamide, glycidyl methacrylate, methacryloxypropyltriethoxysilane, acrylate monomers (such as ethyl acrylate, butyl acrylate and the like), styrene, acrylonitrile, acrylamide, acrylic acid, acryloxypropionic acid, vinyl pyridine, and N-vinylpyrrolidone. In addition, as much as 5% of maleic anhydride or itaconic acid may be used. It is important that the chain transfer of the polymerizing chains to its own polymer be minimal relative to transfer with the polyolefin chains for the efficient production of homogenous non-gelled graft polymer in good yield.

The molecular weight of the acrylic graft as measured by the weight average molecular weight of the ungrafted co-prepared acrylic polymer may be about 20,000 to 200,000. The preferred range is 30,000 to 150,000.

The process of graft polymerizing the monomer leads to the production of ungrafted and grafted material. The amount of grafted material is in the range of 5% to 50% of the total acrylic polymer or copolymer produced. The graft copolymer is prepared in a process that polymerizes the monomer in the presence of the non-polar polyolefin. The process is conducted in a solvent which swells or dissolves the non-polar polymer. The solvent is also one that has no or low chain transfer ability. Examples include non-branched and branched aliphatic hydrocarbons, chlorobenzene, benzene, t-butylbenzene, anisole, cyclohexane, naphthas, and dibutyl ether. Preferably, the solvent is easy to remove by extrusion devolatilization, and therefore has a boiling point below 200° C., preferably below about 150° C. To avoid excessive pressure, a boiling point above about 100° C. is also preferred.

The final solids content (which includes polyolefin and acrylic polymer) depends on the viscosity and the ability to mix well. The practical limits are 20% to 70% but the solids content can be as high as is consistent with good mixing for economy. Preferably, the solids content falls in the range of about 35% to about 60%.

A gradual addition or multicharge addition of the monomer is preferred. Optionally, the monomer charge need not be the same throughout, for example, the last 0–20% may contain all of the monomer used in minor amount to concentrate that monomer in one portion of the polymer.

The temperature during the polymerization can be in the range 110° to 200° C. but the preferred range is 130° to 175° C. Especially preferred is 145° to 160° C. The pressure can be atmospheric to superatmospheric, or as high as 2100 kPa or whatever is necessary to keep the reaction mixture in the liquid phase at the polymerization temperature.

The unreacted monomer concentration should be kept low during the reaction. This is controlled by balancing the radical flux and the monomer feed conditions.

For polymerization, oil-soluble thermal free-radical initiators are used. Those that work in this process are those with a one hour half life at about 60° to about 200° C. The preferred ones have a one hour half life in the range 90° to 170° C. Suitable free radical initiators include peroxy initiators such as t-butyl peroxypivalate, lauroyl peroxide, 1,1,3,3-tetramethylbutyl peroxy-2-ethyl hexanoate, 2,5-dimethyl-2,5-bis(2-ethylhexanoylperoxy)hexane, acetyl peroxide, succinic acid peroxide, t-butyl peroctoate, benzyl peroxide, t-butyl peroxyisobutyrate, t-butyl peroxymaleic acid, 1-hydroxy-1-hydroperoxydicyclohexyl peroxide, 1,1-bis(t-butylperoxy)-3,3,5-trimethylcyclohexane, t-butyl peroxycrotonate, 2,2-bis(t-butylperoxybutane), t-butylperoxy isopropyl carbonate, 2,5-dimethyl-2,5-bis(benzoylperoxy)-hexane, t-butyl peracetate, methyl ethyl ketone peroxide, di-t-butyl diperoxyphthalate, t-butyl perbenzoate, dicumyl peroxide, 2,5,dimethyl-2,5-di(t-butylperoxy)-hexane, 2,4-pentanedione peroxide, di-t-butyl peroxide, 2,5,-dimethyl-2,5-di(t-butylperoxy)-hexyne-3, 1,1,3,3-tetramethylbutyl hydroperoxide, cumene hydroperoxide, 2,5-dimethyl-2,5-di(hydroperoxy)hexane, t-butyl hydroperoxide, t-butyl cumyl peroxide, p-menthane hydroperoxide and azo-bis-isobutyronitrile.

The initiator is introduced together with the monomer during the polymerization in a manner to maintain a fairly constant radical flux during most of the polymerization. This is done to achieve the correct high molecular weight, a high graft efficiency, the desired molecular weight distribution, and freedom from gel.

Radical flux can be defined as the calculated rate of formation of free radicals, expressed in equivalent of radicals per liter per minute. While not being capable of being measured experimentally, this may be calculated from the known rate of decomposition of the free radical initiator present at any time, and its instantaneous concentration. Decomposition rates for initiators are determined from published literature, and the concentration is either a known constant, as in continuous feed of initiator, or can be calculated (for a single charge of initiator) from the known decomposition rate constant and the time elapsed since feed.

Good results are achieved when a uniform radical flux is maintained and the radical flux is calculated to be in the range 0.00001 to 0.0005 equivalents of radicals per liter per minute. The preferred range is 0.00002 to 0.0002 equivalents of radicals per liter per minute. The radical flux is dependent on the specific initiator utilized, its concentration and rate of decomposition, and the reaction temperature chosen. The rate of decomposition can be found in tabulated data, such as in "*The Polymer Handbook*", 2nd Edition, ed. Brandrup and Immergut, Wiley and Sons, N.Y. (1975), or provided by the manufacturer. Even if the exact rate constant at the temperature of interest is not known, often activation energies are supplied from which the rate can be calculated. The radical flux is:

Radical flux $= 2(k_d)(60)(I)$ where $k_d$ is that rate constant for decomposition of the particular initiator in units of inverse seconds, and I the concentration of the initiator in mol/liter. In a batch reaction, I steadily decreases from $I_o$, the initial charge, and the radical flux is not constant. When initiator is continuously fed, a calculation must be made to determine the instantaneous concentration of initiator, but the value is much more constant than in a batch reaction, especially with careful control of initiator feed.

The process may be run in a semi-continuous or continuous manner. Monomer, solvent, and initiator may be added by means similar to those described above. Polymer may be separately dissolved in solvent and added at a rate essentially equivalent to that of product removal, or polymer may be melted and added as a solid to the reaction by means of an extruder.

After the polymerization, a hold time may be used. Then the mixture is devolatilized to remove solvent and any unreacted monomer. Acceptable devolatilizing devices include a devolatilizing extruder, a rotary film evaporator, or any other convenient stripping device as known in the art. The polymerization reaction mixture may be conveyed to the devolatilization apparatus as a batch or continuously.

Prior to, during, or after the devolatilization step, appropriate additives may be admixed into the graft copolymer solution/suspension which are desired to be present in the isolated graft copolymer. If such additives do not affect the grafting reaction, they may be added prior to, during, or after the polymerization process. Such additives may also be added when the graft copolymer is blended with the matrix polymer. Such additives may include stabilizers against light or heat, such as benzotriazoles, hindered amines, alkyl polysulfides such as dialkyl disulfides, and the like, lubricants, or plasticizers; flame retardants; and the like. Preferred is the addition of a disulfide, such as di-n-dodecyl disulfide or di-t-dodecyl disulfide and the like at levels between about 0.001% to about 0.05% by weight of graft polymer, based on the weight of graft copolymer plus matrix polymer, to stabilize the acrylic portion of the graft copolymer against thermal degradation during melt processing while admixing into the matrix or blending and extruding.

A second class of stabilizer is the tris(polyalkylhydroxybenzyl)-s-triazinetriones. Preferred is tris-(4-t-butyl-3-hydroxy-2,6-dimethylbenzyl)-s-triazine-(1H, 3H, 5H)-trione, at levels from about 0.001 to about 0.1% by weight, based on the total polymer weight.

Stability may also be imparted to the acrylic portion of the graft copolymer by including an alkylthioalkyl (meth)acrylate, preferably ethylthioethyl methacrylate, with the acrylic monomer or monomers during the graft polymerization.

The product is then isolated by stranding, cooling, chopping, drying, and bagging, or other known collection techniques.

The polyolefin and the graft copolymer concentrate may be blended by mixing the dry feed materials and extruding either directly to form a film, sheet or the like, or by collecting the blend and reprocessing it into the desired article, or by adding the polyolefin in the course of the devolatilization.

Polyolefins are often produced with one or more stabilizers to prevent degradation of the polymer appearance or physical properties during processing and/or end use. Such stabilizers may include metal salts such as metal stearates, which act as acid acceptors, hindered phenols, which act as anti-oxidants, and sulfur-containing organic esters or derivatives, added as heat stabilizers. Examples of such additives, which are usually proprietary to the supplier, are metal stearates, 2,6-dimethylphenolic compounds, and thiodiesters of long-chain alcohols. Polyolefins may also contain light stabilizers, such as hindered amines, benzotriazoles, and the like. All of the polyolefins used in the present examples are thought to contain small amounts of these proprietary stabilizers.

One way to specify the blend composition is that at least about 0.2% of the total formulation (polyolefin plus graft copolymer) should be chemically grafted acrylic polymer or copolymer within the molecular weight limits specified. The maximum amount is about 10% grafted acrylic polymer, with up to about 5% grafted acrylic polymer being preferred for cost optimization and optimization of most properties of the blend.

Optionally, the blend of concentrate and polyolefin may be further modified by the introduction of fillers, both inorganic and organic, fibers, impact modifiers, colorants, stabilizers, flame retardants, and/or blowing agents.

Blowing agents may be gases, such as nitrogen or carbon dioxide, admixed with the polymer melt in the extruder and allowed to expand upon extrusion. More often, blowing agents are solids which liberate gases, usually nitrogen, at a specific melt temperature, and which are mixed into the melt, or blended from a precompounded mixture of the blowing agent dispersed in a polymeric matrix. The melt temperatures for the polyolefins are typically in the range of about 200° to about 230° C., although other temperatures may be used, depending on the specific blowing agent. Solid blowing agents include azo compounds such as azodicarbonamides, azoisobutyronitriles, hydroazo compounds, or compounds containing the nitroso group.

The blend of the graft copolymer and polyolefin is useful in thermoforming, film making (especially blowing and extruding), blow molding, fiber spinning, acid and basic dyeing, foaming, extrusion (sheet, pipe, and profile), coextrusion (multilayer film, sheet, preforms, and parisons, with or without the use of tie layers), hot melt adhesives, calendering, and extrusion coating (for the preparation of polymer/fabric, carpet, foil, and other multilayer constructions). Such graft copolymers, especially with small amounts of copolymerized acid functionality, are useful when blended with polyolefins for improved printability. The grafts themselves may be used as tie layers between otherwise incompatible polymers.

In extrusion, the graft copolymer is useful, especially with LLDPE, at reduction of melt fracture without an effect on the melt flow rate. Unlike the additives of U.S. Pat. No. 4,094,297, the present additives do not plate out when the modified polyolefin is extruded for extended times.

When polypropylene is modified with the graft copolymers of the present invention, it may be employed in the manufacture of many useful objects, such as extrusion- or injection-blown bottle for packaging of foodstuffs, aqueous solutions such as intravenous feeds, hot-filled items such as ketchup, or extruded articles in profile form such as clips, scrapers, window and door casings and the like. The foamed articles may be used as substitutes for wood in moldings, for packaging materials, for insulation or sound-deadening materials, for food containers, and other rigid-article applications. Films may be used in many protective or wrapping applications, such as for food packaging, blister packaging of consumer goods, and the like.

The graft copolymers of the present invention are useful in preparing polyolefin fibers, especially polypropylene fibers; they are especially useful when the graft copolymer is formed from a polypropylene trunk. Polypropylene is relatively easy to process into fibers having high strength and toughness.

Polypropylene fibers show certain deficiencies which include difficulty in dyeing and poor long-term dimensional stability. Grafts containing functional sites capable of accepting dye may be prepared by the present process by incorporating low levels of dye-accepting monomers, such as methacrylic acid, dimethylaminoethyl methacrylate, N-vinylpyridine, and the like. The improved sag resistance noted for the present graft polymers in a polypropylene matrix should correspond to improvements in creep resistance of the fiber.

Polypropylene may be formed into fibers by sitting tape from extruded film to form large-denier, coarse fibers, by extruding monofilaments into large-denier fibers with a controlled cross-sectional size, or by extruding multifilaments through a spinnerette to produce bundles of small-denier fibers. In all cases, the fibers may be drawtextured. As an example, small-denier polypropylene fiber bundles may be extruded from a 25.4-mm, single-screw extruder having a screw length-to-diameter ratio of 24:1, such as that supplied by Killion Extruders Corp. of Cedar Grove, N.J. and equipped with a static mixer, metering pump and spinnerette assembly with multiple orifices. Using such equipment the extruded polypropylene would be passed though a cooling bath and then over a series of godets (metal rolls with heating or cooling capability) to orient the polymer or quench existing orientation.

Polypropylene fibers may be used for, among other things, strapping, netting (including fish nets), slit tape, rope, twine, bags, carpet backing, foamed ribbon, upholstery, rugs, pond liners, awnings, swimming-pool covers, tarpaulins, lawn-furniture webbing, shades, bristles, sutures, cigarette filters, nonwoven fabrics, such as for tea bags, bed sheets, bandages, diaper liners and the like, and for doll hair, apparel and the like.

The graft copolymer of the present invention may also be used to improve the compatibility of polymers in blends where they would otherwise be poorly compatible. The graft copolymer is incorporated into such blends, preferably at levels of from about 0.2 to about 10%, preferably from about 0.5 to about 5%, and more preferably from about 0.8 to about 2.5%, to achieve the desired improvement in compatibility. Higher levels of the graft copolymer may be used, but increases above the preferred level generally shown only small improvements in compatibility.

As noted above, compatibility is not easily predicted. As a general rule non-polar polymers are poorly compatible with more polar polymers, but poorly compatible blends may also be found experimentally among polar-polar or non-polar-non-polar blends. Examples of the non-polar polymers are olefinic polymers such as high- and low-density polyethylene and linear low-density polyethylene, polypropylene including atactic polypropylene, poly-1-butene, poly-iso-butylene, ethylene-propylene rubber, ethylene-acrylic acid copolymer, ethylene-propylene-diene terpolymer rubber, ethylene-vinyl acetate copolymer, poly (ethylene-propylene), polymethylpentenes, and ionomers such as polymers of ethylene with metal-salt-neutralized acrylic acid.

Relatively more polar polymers, called polar polymers for the purposes of this disclosure, include acrylonitrile-butadiene-styrene polymer, acetal polymers, polyarylates, acrylic-styrene copolymers, acrylonitrile-styrene-acrylic polymers, acrylonitrile-styrene polymers modified with ethylene-propylene rubber, cellulosics, polyester-polyether block copolymers, polyesters such as polybutylene terephthalate and polyethylene terephthalate, and including liquid-crystal polyesters, polyetheramides, polyetheretherketones, polyetherimides, polyethersulfones, ethylene-vinyl alcohol copolymers, polyvinyl chloride, chlorinated polyvinyl chloride, polyvinylidene chloride and fluoride, styrene polymers such as polystyrene, high-impact polystyrene, styrene-acrylonitrile copolymers, styrene-butadiene compolymers, styrene-maleic anhydride copolymers, alkyl-substituted styrenes copolymerized with styrene alone or with the additional monomers listed for styrene, polyphenylene ether, polyphenylene sulfide, polysulfone, polyurethane, polyamides, i.e., nylons such as nylon 6, nylon 6.6, nylon 6.9, nylon 6.10, nylon 6.12, nylon 11, nylon 12, amorphous nylons, polyamideimide, polycaprolactone, polyglutarimide, poly(methyl methacrylate), other $C_1$ to $C_8$ poly(alkyl(meth)acrylates) and polycarbonates. The acrylic polymers referred to above are polymers containing at least 50 weight percent, and preferably at least 80 weight percent, of mers of acrylic acid and/or methacrylic acid (referred to collectively as (meth)acrylic acid) or their esters, preferably their alkyl esters and more preferably their alkyl esters in which the alkyl group contains from one to eight, preferably one to four, carbon atoms. The remaining mers are those from one more monomers copolymerizable with the (meth)acrylic acid or ester by free-radical polymerization, preferably vinylaromatic monomers, vinyl esters or vinyl nitriles, and more preferably mers of styrene or acrylonitrile.

In the examples which follow, polymer concentrates and polymer blends were tested using standard procedures which are summarized below.

Unreacted monomer in the reaction mixture prior to solvent removal or subsequent to extruder devolatilization was determined using a gas chromatographic technique.

The collected volatiles were analyzed by gas chromatography on a 25 meter CP wax 57 CB wall coated open tubular fused silica column at 40° C. A comparison of the major signals for the solvent with the MMA signal was used to determine the amount of residual monomer in the reactor and therefore give a measure of conversion immediately. A more accurate measure of conversion was obtained by a C,H,O analysis of the graft copolymer. The carbon content was used to calculate EPDM or polypropylene content by interpolating between the carbon content of EPDM (85.49%) or polypropylene (85.87%) and acrylic polymer (60.6%).

The graft copolymers are analyzed by solvent extraction to remove the ungrafted (meth)acrylic portion, whose molecular weight is then determined by gel permeation chromatographic technique. A technique for separating the graft copolymer from ungrafted polyolefin is not available. For concentrates, 0.8-1.3 g of polymer was placed in a centrifuge tube with 17 cm$^3$ of xylene. The tube was shaken overnight. Then the tube was placed in an oil bath set at 138° C. The tubes were periodically taken from the bath and shaken until all polymer had dissolved. The fact that all dissolved indicates that no crosslinking occurred. The tubes were cooled during which time the polypropylene containing substances precipitate. Then the tubes were centrifuged at 15,000 rpm for 2 hours and the xylene solution was removed with care not to remove any floats. The molecular weight of the acrylic polymer extracted by the xylene was determined by gel permeation chromatography. The procedure was repeated on the resulting plug to extract additional (meth)acrylate. The value labelled % graft is the portion of the (meth)acrylic polymer formed which remains with the polyolefin plug after repeated extraction. The composition is determined from the carbon analysis of this plug.

The polypropylene concentrate and any additives were blended in the melt on a 7.6 cm by 17.8 cm electric mill with a minimum gap of 3.8 mm set at 190° C. Once the material had fluxed, it was mixed an additional 3 minutes. Higher temperatures were used for higher viscosity materials (for example, mfr=0.5-2 material was done at 195°-210° C.). While still hot, the material was either compression molded or cut into small chunks (about 1-2 cm in each dimension) for granulation (5 mm screen). It is of interest that the additives of the present invention contribute to easy release from hot metal surfaces, such as mill rolls, Haake Rheocord bowls, etc.

Milling of polyethylene was done in a similar manner except that the HDPE blends were milled at 200° C. and the LLDPE blends were milled at 170° C.

A 2.5 cm Killion extruder was used for extrusion blending. A two stage screw was used at 150 rpm, with all three zones set for 190° C. The one-strand die was also set at the same temperature. A vacuum vent was used. The strand was cooled in water and pelletized. The extrusion rate was 4.5 kg per hour.

Melt blending in a Haake Rheocord (a batch melt mixer) was done on 50 g samples at 190° C. or at 210° C. and 100 rpm in air. Mixing was continued for three minutes after peak torque was reached. Sample size was 50 grams.

The polyolefin blends were compression molded in an electrically heated Carver press 15×15 cm or Farrel press 30.5×30.5 cm. The samples were molded between aluminum plates with an appropriate spacer to provide the required thickness 0.25-3.8 mm. In one method the hot melt was taken directly from the mill roll and placed between two aluminum sheets. This was then placed in the press set at 190° C. and pressed at high pressure (68-91 metric tonnes for the Farrel press and 6820 kg for the Carver press). After three minutes the mold was placed in an unheated press at high pressure for three minutes. In the other procedure, granulated material or pellets produced from an extrusion, Haake, or milling operation were dried and then compression molded. The procedure used was the same as for molding a melt except that a 5 minute preheat was used while maintaining a slight pressure on the press. This was followed by the high pressure molding in the hot and cold presses. A hot press of 190° C. was usually sufficient for mfr=4 polypropylenes, but higher viscosity polypropylenes would split during sag testing unless higher molding temperatures were used (195°-210° C.).

Polyethylene was molded in a similar manner except that HDPE was molded at 170° C. and LLDPE at 150° C.

Injection molding of polypropylene was performed on a Newbury injection molding machine in an ASTM family mold. Material to be molded was dried for 16 hours at 60° C. The first barrel zone was set for 204° C., and the other two barrel zones and the nozzle were set for 218° C. The ram time was set for 3 seconds and the cycle of 15 seconds for injection and 45 seconds overall was used. The injection pressure was 2100 kPa and the back pressure was 690 kPa. The screw speed was 100 rpm. Both mold platens were set for 60° C.

The sag tests are performed on a compression molded sheet 10×10×0.15 cm. This sheet was clamped in a frame with a 7.6-cm-square opening. There were metal rulers attached to the front and back of the frame for use in measuring sag. The frame and sheet were placed in a hot, forced air oven (typically at 190° C.). The amount of sag of the center of the sheet was then recorded as a function of time. Typically, the sag was first recorded at 2.5 cm but for slow sagging materials sags as low as 16 mm were recorded. Data was recorded up to 10.2 cm of sag or for 30 minutes, whichever occurred first.

The term "slope" refers to the slope of a plot of the natural logarithm of the sag in centimeters versus time, resulting in a straight line. A high slope indicates that the material sags quickly while a low slope indicates that it sags slowly. The advantage of comparing slopes in this manner is that it eliminates any differences in oven cooling when the sample is introduced (due to differences in the time the oven is open, room temperatures, etc.).

Crude thermoforming was done in the laboratory to illustrate this melt strength effect. A sheet of polypropylene or modified polypropylene was heated in a forced air oven at 190° C., removed from the oven, placed over a female mold, and subjected to vacuum.

The capillary flow data were measured on a Sieglaff McKelvey rheometer. The flows were recorded at ten shear rates (1 to 100-reciprocal seconds) at each temperature. The data was fit to the power law, i.e., viscosity=k(temperature)×(shear rate)y, and the values at 1 and 1000 reciprocal seconds were calculated from this best fit equation. The parallel plate viscosity refers to measurements on the Rheometrics Dynamic Spectrometer, recorded at a strain of 5%.

Differential scanning calorimeter (DSC) measurements of melting and nucleation were performed on a duPont instrument. A value of 59 cal/g was used for the heat of crystallization and per cent crystallinity was corrected for the presence of the melt additive. The nucleation temperature was measured in an experiment in which the polypropylene was melted at 200° C. for 2 minutes and then cooled at 10° C./min. The temperature at which peak crystallization occurred is called the nucleation temperature. The isothermal crystallization time was recorded by cooling the molten polypropylene quickly to 127° C. and the exotherm recorded with time.

The physical properties of the polypropylene homopolymer and "medium impact" copolymer are determined on extruded and injection molded samples, although similar results have been observed in milled and compression molded samples. In certain examples below are described specialized equipment for preparing foamed sheet, rod or profile, extruded rod or tubing, fibers, cast film, monoaxially oriented and biaxially oriented film, and injection blow-molded bottles or hollow containers.

The examples are intended to illustrate the present invention and not to limit it except as it is limited by the claims. All percentages are by weight unless otherwise specified and all reagents are of good commercial quality unless otherwise specified.

EXAMPLE 1

This example illustrates preparation of a Graft Copolymer (GCP) of Polypropylene (PP), Methyl Methacrylate (MMA) and Ethyl Acrylate (EA).

A polypropylene-acrylic graft copolymer is made by polymerizing a 5% ethyl acrylate (EA)- 95% methyl methacrylate (MMA) monomer mixture in the presence of polypropylene (weight ratio of polypropylene:-monomer=0.67:1). Radicals are generated from ditertiary-butyl peroxide (DTBPO) at the rate of 0.00010 moles per liter per minute (radical flux). Monomer and initiator are fed over 60 minutes and the theoretical (100% conversion) solids at the end of the reaction is 55%.

A 6.6 liter reactor equipped with a double helical agitator (115 rpm) was charged with 1780 g of an inert hydrocarbon solvent mixture of 2-methylalkanes having 6–12 C-atoms and 880 g polypropylene (mfr=4) and heated to 175° C. After 2 hours the temperature was decreased to 155° C. and the batch was stirred for 1 additional hour. Over a two minute period two solutions were added. The first consisted of 1.04 g of di-t-butyl peroxide in 21 g of the hydrocarbon solvent. The second consisted of 0.06 g of di-t-butyl peroxide in 2.1 g of ethyl acrylate and 42 g of methyl methacrylate. For the next 58 minutes at the same feed rate a feed of 1.87 g of di-t-butyl peroxide and 62 g of ethyl acrylate in 1215 g of methyl methacrylate was added at the same feed rate as the second feed. This feed schedule results in a radical flux of 0.00010 during the feed time. After the feed was complete the reaction was held at 155° C. for an additional 15 minutes. Then it was devolatilized by passing through a 30-mm Werner-Pfleiderer extruder with two vacuum vents at 200°–250° C. The concentrate product (concentrate) is a mixture wherein the elemental analysis showed that the composition is 56% (meth)acrylate. Extractive results showed 15.9% of the polymerized (meth)acrylic monomers were grafted, and the $M_w$ of the (meth)acrylic polymer was 91,300. The concentrate may be blended with other thermoplastic polymers such as polypropylene.

The following Table shows the efficiency of the above concentrate blended at different levels in improving sag resistance of a polypropylene homopolymer having a melt flow rate(mrf=4) of four.

TABLE I

| Wt. % of concentrate in blend | sag slope, min$^{-1}$ | sample thickness (mm) | sag at 17 min (cm) |
|---|---|---|---|
| 0 | 0.18 | 1.75 | 2.29 |
| 1.5 | 0.12 | 1.45 | 6.10 |
| 2.5 | 0.12 | 1.70 | 4.57 |
| 3.3 | 0.06 | 1.78 | 3.05 |
| 5.0 | 0.045 | 1.73 | 1.27 |
| 7.5 | 0.030 | 1.75 | 1.02 |

EXAMPLES 2–51

A polypropylene-acrylic graft copolymer is made by polymerizing a 5% ethyl acrylate (EA)-95% methyl methacrylate (MMA) monomer mixture in the presence of polypropylene (weight ratio of polypropylene:-monomer=0.67:1). Radicals were generated from di-tertiary-butyl peroxide (DTBPO) at the rate of 0.00010 moles per liter per minute (radical flux). Monomer and initiator were fed over 60 minutes and the theoretical (100% conversion) solids at the end of the reaction was 52.5%.

A 6.6 liter reactor equipped with a pitched-blade turbine agitator (375 rpm) was charged with 1880 g hydrocarbon solvent and 840 g polypropylene and heated to 155° C. The mixture was stirred for 3 hours. Over a two minute period two solutions were added. The first consisted of 1.06 g of di-t-butyl peroxide in 21 g of hydrocarbon solvent, as in Example 1. The second consisted of 0.06 g of di-t-butyl peroxide in 2.1 g of ethyl acrylate and 40 g of methyl methacrylate. For the next 58 minutes a feed of 1.87 g of di-t-butyl peroxide and 61 g of ethyl acrylate in 1157 g of methyl methacrylate was added at the same feed rate as the second feed. This feed schedule should produce a radical flux of 0.00010 during the feed time. After the feed was complete, the reaction was held at 170° C. for an additional 15 minutes. Then it was devolatilized by passing through a 30-mm Werner-Pfleiderer extruder with vacuum vents at 200°–250° C. The concentrate showed that the composition is 51% acrylate.

Additional polypropylene-acrylic graft copolymers (Examples 2–51) were prepared by the procedure of this Example and evaluated as 3.5% blends in polypropylene (mfr=4) as melt strength additives. The following Table illustrates the polymerization conditions for the concentrate and the percent acrylic polymer present in the concentrate with the sag resistance of the blend with the polypropylene.

In the following Table II, DTBPO is di(t-butyl)-peroxide, TBPB is t-butyl perbenzoate, and DDBH is 2,5-dimethyl-2,5-di(t-butylperoxy)hexane.

TABLE II

| Ex. | sag slope min$^{-1}$ | % acrylic in conc | initiator | solids % | polymer temp. °C. | feed time min | radical flux | % EA in MMA |
|---|---|---|---|---|---|---|---|---|
| Con* | 0.15–0.18 | — | — | — | — | — | — | — |
| 1 | 0.03–0.05 | 56 | DTBPO | 55 | 155 | 60 | 0.00010 | 5 |
| 2 | 0.06 | 51 | DTBPO | 52.5 | 155 | 60 | 0.00010 | 5 |
| 3 | 0.06 | 52 | DTBPO | 55 | 155 | 60 | 0.00010 | 5 |
| 4 | 0.045 | 55 | DTBPO | 55 | 150 | 60 | 0.00010 | 5 |
| 5 | 0.08 | 57 | DTBPO | 55 | 145 | 60 | 0.00010 | 5 |
| 6 | 0.05 | 57 | DTBPO | 57 | 150 | 60 | 0.00010 | 5 |
| 7 | 0.10 | 49 | DTBPO | 55 | 150 | 60 | 0.00007 | 5 |
| 8 | 0.06 | 53 | DTBPO | 55 | 150 | 60 | 0.00015 | 5 |
| 9 | 0.06 | 55 | DTBPO | 55 | 150 | 60 | 0.00010 | 10 |
| 10 | 0.11 | 53 | DTBPO | 55 | 150 | 60 | 0.00010 | 0 |
| 11 | 0.056 | 48 | DTBPO | 55 | 155 | 60 | 0.00010 | 10 |
| 12 | 0.07 | 51 | DTBPO | 50 | 150 | 60 | 0.00010 | 5 |
| 13 | 0.11 | 58 | DTBPO | 55 | 145 | 120 | 0.00007 | 5 |
| 14 | 0.10 | 57 | TBPB | 55 | 145 | 120 | 0.00007 | 5 |
| 15 | 0.09 | 56 | TBPB | 55 | 150 | 120 | 0.00010 | 5 |
| 16 | 0.12 | 54 | TBPB | 55 | 150 | 120 | 0.00007 | 5 |
| 17 | 0.13 | 55 | TBPB | 55 | 150 | 120 | 0.00015 | 5 |
| 18 | 0.06 | 55 | DTBPO | 55 | 150 | 120 | 0.00007 | 5 |
| 19 | 0.06 | 49 | TBPB | 55 | 150 | 60 | 0.00010 | 5 |
| 20 | 0.10 | 51 | TBPB | 55 | 150 | 120 | 0.00010 | 5 |
| 21 | 0.14 | 57 | TBPB | 56 | 150 | 120 | 0.00010 | 5 |
| 22 | 0.13 | 51 | TBPB | 55 | 150 | 60 | 0.00010 | 5 |
| 23 | 0.15 | 55 | TBPB | 55 | 150 | 120 | 0.00010 | 0 |
| 24 | 0.15 | 56 | DDBH | 55 | 150 | 120 | 0.00010 | 5 |
| 25 | 0.14 | 57 | TBPB | 55 | 150 | 120 | 0.00015 | 5 |
| 26 | 0.09 | 51 | TBPB | 55 | 150 | 60 | 0.00010 | 5 |
| 27 | 0.15 | 54 | DDBH | 55 | 150 | 120 | 0.00010 | 0 |
| 28 | 0.11 | 51 | DDBH | 55 | 155 | 120 | 0.00010 | 5 |
| 29 | 0.10 | 53 | DTBPO | 50 | 150 | 120 | 0.00007 | 5 |
| 30 | 0.10 | 54 | DTBPO | 50 | 150 | 120 | 0.00005 | 5 |
| 31 | 0.15 | 53 | DTBPO | 50 | 150 | 120 | 0.00005 | 5 |
| 32 | 0.10 | 51 | DTBPO | 55 | 150 | 120 | 0.00007 | 5 |
| 33 | 0.12 | 55 | TBPB | 55 | 150 | 120 | 0.00007 | 5 |
| 34 | 0.18 | 55 | DDBH | 55 | 150 | 120 | 0.00007 | 5 |
| 35 | 0.07 | 53 | DTBPO | 55 | 150 | 120 | 0.00005 | 5 |
| 36 | 0.09 | 51 | DTBPO | 55 | 150 | 120 | 0.00010 | 5 |
| 37 | 0.14 | 51 | TBPB | 55 | 150 | 120 | 0.00005 | 5 |
| 38 | 0.10 | 37 | DTBPO | 55 | 155 | 60 | 0.00010 | 5 |
| 39 | 0.11 | 43 | DTBPO | 55 | 155 | 120 | 0.00007 | 5 |
| 40 | 0.08 | 48 | DTBPO | 55 | 155 | 120 | 0.00005 | 5 |
| 41 | 0.10 | 47 | DTBPO | 55 | 155 | 120 | 0.00007 | 5 |
| 42 | 0.07 | 48 | DTBPO | 55 | 155 | 60 | 0.00010 | 5 |
| 43 | 0.10 | 43 | DTBPO | 55 | 155 | 120 | 0.00005 | 5 |
| 44 | 0.10 | 50 | DTBPO | 55 | 155 | 120 | 0.00007 | 5 |
| 45 | 0.10 | 54 | DTBPO | 55 | 150 | 120 | 0.00010 | 5 |
| 46 | 0.10 | 54 | DTBPO | 55 | 150 | 120 | 0.00007 | 5 |
| 47 | 0.07 | 54 | DTBPO | 55 | 150 | 120 | 0.00005 | 5 |
| 48 | 0.08 | 56 | DTBPO | 55 | 150 | 120 | 0.00007 | 5 |
| 49 | 0.08 | 55 | DTBPO | 55 | 145 | 120 | 0.00007 | 5 |
| 50 | 0.09 | 56 | DTBPO | 55 | 145 | 120 | 0.00005 | 5 |
| 51 | 0.08 | 55 | DTBPO | 55 | 145 | 120 | 0.00010 | 5 |

*Control = PP with no concentrate

The calculated percent of grafted acrylic polymer and the molecular weight ($M_w$) of ungrafted acrylic material are tabulated below in Table III on certain samples where the ungrafted acrylic polymer was separated from the concentrate by extraction.

TABLE III

| Example | % Acrylic Polymer Grafted to PP | $M_w$ |
|---|---|---|
| 2 | 12.3 | 107,000 |
| 10 | 10.6 | 119,000 |
| 11 | 29.8 | 71,800 |
| 45 | 14.8 | 43,000 |
| 46 | 10.7 | 62,000 |
| 47 | 21.7 | 87,300 |

Note:
($M_w$ = weight average molecular weight)

EXAMPLE 52-54

This example shows a larger scale preparation of a polypropyleneacrylic graft copolymer made by polymerizing a 5% ethyl acrylate (EA)-95% methyl methacrylate (MMA) monomer mixture in the presence of polypropylene (weight ratio of polypropylene:-monomer=0.67:1). Radicals were generated from di-tertiary-butyl peroxide (DTBPO) at the rate of 0.000065 moles per liter per minute (radical flux). Monomer and initiator were fed over 122 minutes and the theoretical (100% conversion) solids at the end of the reaction was 47%.

A 380 liter reactor equipped with a back-slope turbine agitator was charged with 102.3 kg of the hydrocarbon solvent and 36.4 kg of mfr=4 polypropylene homopolymer and heated to 150° C. over 4 hours. Two solutions were added over a twenty minute period. The first consisted of 82 g of di-tertiary-butyl peroxide in 826 g of the hydrocarbon solvent. The second consisted of 454 g of EA and 8.6 kg of MMA. Addition of the first solution was then continued at a lower rate to feed an additional 82 g of di-tertiary-butyl peroxide and 826 g of the hydrocarbon solvent over 90 minutes. At the same time the monomer addition of 2.3 kg of EA and 47.5 kg of MMA was continued over 102 minutes (ending 12 minutes after the initiator feed had finished). The reaction was held at 150° C. for an additional 15 minutes. Then an additional 23 kg of hydrocarbon solvent was pumped in over 30 minutes. The reaction mixture was then devolatilized by passing through a 20-mm Welding Engineers twin-screw extruder at 200 rpm and 200°–250° C. over 14 hours. This concentrate is Ex. 52. Similar preparations labelled 53 and 54 were synthesized with changes in feed time and radical flux as indicated. The following Table IV shows the improvement in sag resistance when concentrates of Example 52, 53 and 54 are blended with polypropylene of mfr=4:

TABLE IV

| Ex. | % Conc in Blend | Sag Slope $min^{-1}$ | Weight Fraction Acrylic in conc. | Initiator | Solids | Polymer temp | Feed Time | Rad. Flux |
|---|---|---|---|---|---|---|---|---|
| Con. | none | 0.19 | — | | | | | |
| 52 | 2.5 | 0.11 | 0.6 | DTBPO | 47 | 150 | 122 | 0.000065 |
|  | 3.5 | 0.10 | | | | | | |
| 53 | 3.5 | 0.11 | 0.6 | DTBPO | 45 | 150 | 90 | 0.00007 |
|  | 5.0 | 0.10 | | | | | | |
| 54 | 3.5 | 0.15 | 0.6 | DTBPO | 49 | 150 | 78 | 0.00008 |
|  | 5.0 | 0.09 | | | | | | |

EXAMPLE 55

This example and Table V demonstrate the unexpected advantage of the concentrate of Example 4 in the improvement of sag resistance for both high density polyethylene (HDPE) and linear low density polyethylene (LLDPE). Data for HDPE are for polymers of two different mfr values (4 and 8) and are obtained at 150° C. The LLDPE values are on a single resin having a density of 0.917 g/cc, but at two different temperatures. Comparison molded polyethylene samples prepared for this test had a significant increase in gloss over the unmodified control.

TABLE V

| Polyethylene | Wt % Additive | Temp °C. | Time to Sag. Minutes 762 mm | 50.8 mm |
|---|---|---|---|---|
| HDPE, mfr = 8 | 0 | 150 | 8.7 | 9.3 |
|  | 2 |  | 10.2 | 11.9 |
|  | 3.5 |  | 15.8 | 30.0 |
|  | 5 |  | 31.4 | — |
| HDPE, mfr = 4 | 0 | 150 | 8.0 | 9.0 |
|  | 3.5 |  | 10.5 | 12.0 |
|  | 5 |  | 26.0 | — |
| LLDPE, mfr = 2 | 0 | 170 | 5.3 | 6.0 |
|  | 5 |  | 17.7 | 21.4 |
| LLDPE, mfr = 2 | 0 | 180 | 4.6 | 5.2 |
|  | 5 |  | 8.5 | 10.0 |

EXAMPLE 56

A polyethylene-acrylic graft copolymer concentrate was synthesized in a manner similar to that previously described for polypropylene-acrylic graft copolymers. The polyethylene-acrylic graft copolymer concentrate was made by polymerizing a 100% methyl methacrylate (MMA) monomer mixture in the presence of polyethylene (weight ratio of polyethylene:monomer=0.5:1). Radicals were generated from di-tertiary-butyl peroxide (DTBPO) at the rate of 0.00010 moles per liter per minute (radical flux). Monomer and initiator were fed over 60 minutes and the theoretical (100% conversion) solids at the end of the reaction was 55%.

A 6.6 liter reactor equipped with a double helical agitator (115 rpm) was charged with 1760 g hydrocarbon solvent and 725 g polyethylene (mfr=4, density=0.95) and heated to 150° C. The mixture was stirred for 3 hours. Over a two minute period two solutions were added. The first consisted of 1.63 g of di-t-butyl peroxide in 48 g of methyl methacrylate. For the next 58 minutes a feed of 1.73 g of di-t-butyl peroxide in 1401 g of methyl methacrylate was added at the same feed rate as the second feed. This feed schedule should produce a radical flux of 0.00010 during the feed time. After the feed was complete the reaction was held at 150° C. for an additional 15 minutes. Then it was devolatilized by passing through a 30-mm Werner-Pfleiderer extruder with vacuum vents at 200°–250° C. The elemental analysis showed that the concentrate contained 64% (meth)acrylate.

EXAMPLE 57

This example shows that both polyethylene-acrylic graft polymer and polypropylene-acrylic graft polymer concentrate were effective at reducing the sag of HDPE. The blend of concentrate with HDPE mfr=4 and density=0.95 was milled at 220° C. and the hot material from the mill was molded at 210° C. Sags were measured by the same procedure used for polypropylene sheet except that an oven temperature of 150° C. was used.

TABLE VI

| Concentrate of Example | % Conc. | Sag Slope $min^{-1}$ | 25.4 mm Sag (min) | 76.2 mm Sag (min) |
|---|---|---|---|---|
| Control | none | 0.57 | 7.4 | 9.4 |
| 56 | 5% | 0.27 | 9.0 | 13.0 |

TABLE VI-continued

| Concentrate of Example | % Conc. | Sag Slope min$^{-1}$ | 25.4 mm Sag (min) | 76.2 mm Sag (min) |
|---|---|---|---|---|
| 56 | 10% | 0.11 | 10.0 | 19.8 |
| 4 | 5% | <0.015 | 15.0 | 30 min to 31.7 mm |

EXAMPLE 58

This example shows that the polyethylene and polypropylene graft copolymer concentrates are effective in improving sag resistance of HDPE while ungrafted acrylic polymer of similar $M_w$ is not. Addition of as much as 5% of a commercial acrylic molding powder poly(methyl methacrylate), $M_w$ 105,000, designated "A") showed no decrease in sag rate, while 3% poly(methyl methacrylate) present as the graft copolymer concentrate resulted in large reductions of sag rate.

The specific concentrate used in part of this study was synthesized in the following manner. The polypropylene-acrylic graft copolymer was made by polymerizing a 5% ethyl acrylate (EA)-95% methyl methacrylate (MMA) monomer mixture in the presence of polypropylene of mfr=0.4 (weight ratio of polypropylene:-monomer=0.67:1). Radicals were generated from di-tertiary-butyl peroxide (DTBPO) at the rate of 0.00007 moles per liter per minute (radical flux). Monomer and initiator were fed over 120 minutes and the theoretical (100% conversion) solids at the end of the reaction was 55%.

A 6.6 liter reactor equipped with a pitched-blade turbine agitator (375 rpm) was charged with 1780 g of the hydrocarbon solvent and 880 g polypropylene (mfr=0.4) and heated to 160° C. The mixture was stirred for 2 hours and then the temperature was decreased to 150° C. for one hour. Over a two minute period two solutions were added. The first consisted of 1.22 g of di-t-butyl peroxide in 20 g of the hydrocarbon solvent. The second consisted of 0.0002 mg of monomethyl ether of hydroquinone (MEHQ) and 0.05 g of di-t-butyl peroxide in 1.1 g of ethyl acrylate and 21 g of methyl methacrylate. For the next 118 minutes a feed of 13 mg MEHQ and 2.70 g of di-t-butyl peroxide in 66 g of ethyl acrylate and 1253 g of methyl methacrylate was added at the same feed rate as the second feed. This feed schedule should produce a radical flux of 0.00007 during the feed time. After the feed was complete the reaction was held at 150° C. for an additional 15 minutes. Then it was devolatilized by passing through a 30 mm Werner-Pfleiderer extruder with two vacuum vents at 200°–250° C. The elemental analysis showed that the concentrate contained 53% (meth)acrylate.

The blends of HDPE (mfr=7, density=0.95) and graft copolymer concentrate was milled at 200° C. and the hot materials were formed into sheets from the mill at 170° C. Sags were measured by the same procedure used for polypropylene sheet except that an oven temperature of 150° C. was used.

TABLE VII

| Example | Concentrate Level | Sag Slope min$^{-1}$ | 25.4 mm sag (min) | 50.8 mm sag (min) |
|---|---|---|---|---|
| Control | none | 0.59 | 7.4 | 8.7 |
| A | 3.0% | 0.58 | 7.1 | 8.3 |
| A | 5.0% | 0.54 | 7.6 | 9.0 |
| 56 | 5.0% | 0.27 | — | 10.3 |
| 4 | 2.0% | 0.28 | 8.2 | 10.2 |
| 4 | 3.5% | 0.056 | 9.4 | 15.8 |
| 4 | 5.0% | 0.038 | 10.4 | 31.4 |
| 58 | 3.5% | 0.37 | 7.4 | 9.2 |
| 58 | 5.0% | 0.30 | 8.1 | 10.0 |

EXAMPLE 59

The concentrate of Example 4 was blended with LLDPE and the results of evaluating the sag resistance improvements are shown below in Table VIII. The blend of modifier and LLDPE was milled at 170° C. and the hot material from the mill was milled at 150° C. Sag resistance was measured by the same procedure used for polypropylene sheet at the temperature listed.

"A" is an LLDPE having an mfr=2.3 and a density of 0.92, recommended for casting and extruding applications.

"B" is an LLDPE having an mfr=1 and a density of 0.92, recommended for blow molding and extrusion applications.

TABLE VIII

| LLDPE | Concentrate | Sag Temp. | Sag Slope min$^{-1}$ | 25.4 mm sag (min) | 101.6 mm sag (min) |
|---|---|---|---|---|---|
| A | none | 180° C. | 0.58 | 3.4 | 5.6 |
| A | 5% Ex. 4 | 180° C. | 0.24 | 5.2 | 10.6 |
| A | none | 170° C. | 0.54 | 3.9 | 6.4 |
| A | 5% Ex. 4 | 170° C. | 0.096 | 9.5 | 23.0 |
| B | none | 150° C. | — | 7.8 | 15.6 |
| B | 5% Ex. 4 | 150° C. | — | 33.7 min at 19 mm | |

EXAMPLE 60

This example illustrates improved sag modification and increased nucleation temperature for polybutylene, when blended with the concentrate. Polybutylene, injection grade, mfr=4, with and without 2.44 wt. % of the concentrate of Example 20 were milled at 190° C. and pressed into plaques of about 1.7 mm thickness. Times were measured for various distances of sag at 145° C. DSC curves were used (heat/cool time=20° C./min). A higher crystallization temperature relates to increased speed of nucleation and solidification of the heated polymer.

TABLE IX

| Weight Percent Concentrate | Time to sag (min:sec) | | | DSC Temperature, °C. | |
|---|---|---|---|---|---|
| | 25.4 mm | 50.8 mm | 101.6 mm | Melt | Crystallize |
| Conrtol (0) | 5:20 | 7:50 | 10:23 | 128 | 45 |
| 2.44 wt % | 7:24 | 15:53 | >30 | 129 | 55 |

EXAMPLE 61

This example describes the preparation of a concentrate of polypropylene-acrylic graft copolymer made by polymerizing 5% ethyl acrylate (EA)-95% methyl methacrylate (MMA) monomer mixture in the presence of an equal amount of polypropylene. Radicals were generated from di-tertiary-butyl peroxide (DTBPO) at the rate of 0.00017 moles per liter per minute (radical flux). Monomer and initiator were fed over 30 minutes and the theoretical (100% conversion) solids at the end of the reaction was 50%.

A 6.6 liter reactor equipped with a double helical agitator (115 rpm) was charged with 1980 g of the hydrocarbon solvent and heated to 170° C. 1000 g of polypropylene (mfr=5) was fed to the reactor via a melt extruder set at 200° C. at a rate of about 10 g per minute. After 45 minutes hold at 170° C. the addition of monomer and initiator solutions was begun. Over a two minute period two solutions were added. The first consisted of 0.44 g of di-t-butyl peroxide in 21 g of the hydrocarbon solvent. The second consisted of 0.11 g of di-t-butyl peroxide in 1.3 g of ethyl acrylate and 65 g of methyl methacrylate. For the next 28 minutes a feed of 1.59 g of di-t-butyl peroxide and 19 g of ethyl acrylate in 914 g of methyl methacrylate was added at the same feed rate as the second feed. This feed schedule should produce a radical flux of 0.00017 during the feed. After the feed was complete the reaction was held at 170° C. for an additional 15 minutes. Then it was devolatilized by passing through a 30-mm Werner-Pfleiderer extruder with vacuum vents at 200°-250° C. The elemental analysis (carbon content) showed that the concentrate contained 35% (meth)acrylate.

A sheet of polypropylene (mfr=4) with and without the concentrate of this example was heated in a forced air oven to 190° C., removed from the oven and immediately placed over a female mold and subjected to vacuum. The top and bottom corner measurements were the average of the 8 measurements in mm at the corner of each of the four side faces of the box. The top and bottom center measurements were the average of the 4 measurements in mm at the center of the edge of the 4 faces of the box. These measurements are summarized in Table X and demonstrate smaller wall thickness variations when the concentrate is present.

TABLE X

WALL THICKNESS VARIATION IN THERMOFORMED PARTS

| Polypropylene | Top Center | Top Corner | Bottom Center | Bottom Corner |
|---|---|---|---|---|
| unmodified | 1.14 mm | 0.88 mm | 0.75 mm | 0.025 mm |
| 5% Ex. 61 | 0.97 mm | 0.97 mm | 0.35 mm | 0.21 mm |

EXAMPLE 62

This example demonstrated the unexpected higher nucleation temperature and shorter time for crystallization imparted by addition of the polymeric concentrate of Examples 1 and 52 to polypropylene of mfr=4. The nucleation temperature was measured while cooling at 10° C./min, the melting temperature was measured while heating at 20° C./min and the crystallization time was measured isothermally at 127° C. or 130° C. The extent of crystallization was reported for both cooling and melting measurements. Comparison was made with ungrafted PMMA of similar $M_w$.

EXAMPLE 63

This example demonstrated the lower equilibrium torque and improvement in time to flux for blends of the concentrate of Example 1 with polypropylene of mfr=4 using the Haake Rheocord. The test conditions are described above. Peak torque at flux was also reduced.

TABLE XII

| Wt. % Concentrate in Polypropylene | Time to flux (seconds) | Equilibrium Torque (meter-grams at 215° |
|---|---|---|
| 0 | 109 | 695 |
| 3 | 50 | 690 |
| 5 | 50 | 670 |

EXAMPLE 64

This example shows that a propylene-acrylic graft copolymer concentrate may be used to improve the sag resistance of an acrylic sheet. About 20 parts of the graft polymer of Example 1 was milled with 100 parts of a commercial acrylic molding powder of $M_w$ 105,000 and compression molded. Sag tests indicated that the sheet containing the concentrate may be heated to about 5°-10° C. higher before flow equivalent to that of the unmodified sheet was observed.

EXAMPLES 65-66

Graft copolymer concentrates were prepared according to the process described in Examples 52-54, using the conditions shown in Table XIII.

TABLE XIII

| Concentrate of Example | % Acrylic In Conc. | Initiator | Solids | Monomer Feed Temp, °C. | Time (min) | Radical Flux |
|---|---|---|---|---|---|---|
| A | 55 | DTBPO | 50% | 150 | 120 | 0.00010 |
| B | 55 | DTBPO | 50% | 150 | 120 | 0.00007 |

Concentrates A and B were blended together at a weight ratio of 2.8:1 to form concentrate C. As indicated in Table XIV, concentrate C was blended at the 4% level with polypropylene and the indicated amounts of di-t-dodecyl disulfide (DTDDS) and extruded. The sag results for these blends are given in Table XIV below.

TABLE XIV

| Example | % Concentrate | DTDDS | Sag Slope in min$^{-1}$ |
|---|---|---|---|
| 65 | 4 | none | 0.07 |
| 66 | 4 | 0.03% | 0.05 |
| 67 | 4 | 0.3% | 0.03 |

Stabilizing the concentrate during processing, as by using the DTDDS, is seen to produce even more significant improvement in melt strength.

TABLE XI

| Temp. of crystallization (°C.) | 127 | 127 | 130 | 130 | 130 | 130 | 130 |
|---|---|---|---|---|---|---|---|
| Percent Concentrate | 0 | 5 | 0 | 1.1 | 2.2 | 3.9 | 7.8 |
| Polymer Concentrate of Example | — | 52 | — | 52 | 52 | PMMA | PMMA |
| Crystallization Time, min. | 16.3 | 3.6 | 24.5 | 3.7 | 3.0 | 8.1 | 10.6 |
| Nucleation Temperature, °C. | 105 | 112 | 107 | 118 | 118 | 112 | 110 |
| % Crystallinity | 39 | 40 | 41 | 46 | 42 | 42 | 41 |
| Melting Temperature, °C. | 165 | 166 | 169 | 170 | 168 | 170 | 168 |
| % Crystallinity | 41 | 44 | 44 | 44 | 46 | 46 | 44 |

EXAMPLE 67

This example further demonstrates that the graft copolymer has little effect on the high-shear viscosity but a pronounced effect on low-shear viscosity in polypropylene.

The graft copolymer of Example 1 was admixed at the five weight-percent level with an injection-molding grade of propylene homopolymer, mfr=4, as in Example 63. Capillary and parallel-plate viscosities were measured at various temperatures under conditions described above, under both low and high shear conditions. The results shown in Table XV below demonstrate the increase in low shear viscosity, especially at temperatures below about 210° C., with essentially no effect on viscosity at high shear rate.

TABLE XV

| | | Conditions: | | | |
|---|---|---|---|---|---|
| | | Low Shear | | High Shear | |
| | Temperature | Amount of Graft Polymer: | | | |
| Test | | 0% | 5% | 0% | 5% |
| Capillary Viscosity[a] | 180° C. | 9400 | 133000 | 1900 | 2000 |
| Capillary Viscosity[a] | 190° C. | 80000 | 110000 | 1900 | 1600 |
| Capillary Viscosity[a] | 210° C. | 57000 | 75000 | 1200 | 1100 |
| Parallel Plate Viscosity[b] | 190° C. | 63000 | 99000 | 2100 | 2100 |
| Parallel Plate Viscosity[b] | 210° C. | 54000 | 58000 | 1800 | 1800 |
| Parallel Plate Viscosity[b] | 230° C. | 37000 | 39000 | 1500 | 1400 |

Shear Conditions:
[a] Low Shear = 1.0 sec$^{-1}$; high shear = 1000 sec$^{-1}$
[b] Low Shear = 0.1 sec$^{-1}$; high shear = 500 sec$^{-1}$

EXAMPLE 68

This example shows improved stabilization to weight loss on heating by use of a disulfide or a substituted triazine stabilizer. A polypropylene-acrylic graft copolymer similar to that of Example 4 was blended with stabilizers on the mill roll. The graft copolymer (98 grams) was fluxed on the mill at 195° C. The stabilizer (2 grams) was added and blended in for 2 minutes. The material was removed from the mill, cut into chunks, and granulated. One or more of these stabilized versions were then let down in a similar manner in additional graft copolymer to produce graft copolymer stabilized at the 100–5000 ppm level. The results on the TGA of stabilization are shown in the table. Weight loss (%) is the temperature at which the particular percent weight loss is observed, utilizing a DuPont ThermoGravimetric Analyzer at a heating rate of 20° C. in nitrogen. Although none of the stabilizers were deleterious to stability, only those designated 2 and 7 exhibited significant stability advantages.

The stabilizers studied were:
1. DLTDP (dilauryl thiodipropionate);
2. TNPP (trisnonylphenyl phosphite);
3. Irganox 1010 (tetrakis(methylene(3,5-di-t-butyl-4-hydroxyhydrocinnamate))methane);
4. DTDDS (di-t-dodecyldisulfide);
5. Irgafos 168 (tris-(2,4-di-t-butylphenyl)phosphite);
6. Weston 618 (di-stearyl pentaerythritol diphosphite);
7. Cyanox 1790 (tris(4-t-butyl-3-hydroxy-2,6-dimethylbenzyl)-s-triazine-2,4,6-(1H,3H,5H)-trione;
8. Irganox 1076 (octadecyl 3,5-di-t-butyl-4-hydroxyhydrocinnamate);
9. Topanol CA (3:1 condensate of 3-methyl-6-t-butylphenol with crotonaldehyde.

TABLE XVI

| STABILIZER (PPM) | | | | | | | | | WEIGHT LOSS TEMPERATURE (DEGREES C.) | |
|---|---|---|---|---|---|---|---|---|---|---|
| 1 | 2 | 3 | 4 | 5 | 6 | 7 | 8 | 9 | 1% | 10% |
| | | | | | | | | | 279 | 325 |
| 600 | | | | | | | | | 274 | 318 |
| 2000 | | | | | | | | | 281 | 328 |
| | 600 | | | | | | | | 280 | 327 |
| | 2000 | | | | | | | | 271 | 317 |
| | | 2000 | | | | | | | 275 | 320 |
| | | | | 300 | | | | | 286 | 345 |
| | | | | 1000 | | | | | 297 | 368 |
| | | | | | | | | | 272 | 317 |
| 600 | | 2000 | | | | | | | 279 | 323 |
| 2000 | | 2000 | | | | | | | 278 | 322 |
| | 600 | 2000 | | | | | | | 280 | 323 |
| | 2000 | 2000 | | | | | | | 278 | 321 |
| | | 2000 | 300 | | | | | | 291 | 358 |
| 600 | | 2000 | 600 | | | | | | 280 | 324 |
| | | | | | | | | | 273 | 319 |
| | | | | | 600 | | | | 273 | 318 |
| | | | | | 2000 | | | | 271 | 318 |
| | | | | | | 600 | | | 272 | 319 |
| | | | | | | 2000 | | | 272 | 319 |
| | | | | | 600 | | 2000 | | 273 | 320 |
| | | | | | 2000 | | 2000 | | 274 | 321 |
| | | | | | | 600 | 2000 | | 285 | 328 |
| | | | | | | 2000 | 2000 | | 279 | 322 |
| 600 | | | | | | | 2000 | | 296 | 333 |
| 2000 | | | | | | | 2000 | | 298 | 338 |
| | 600 | | | | | | 2000 | | 286 | 328 |
| | 2000 | | | | | | 2000 | | 285 | 325 |
| | | | | | | | 2000 | | 285 | 325 |
| | | | | 2000 | 600 | | | | 278 | 321 |
| | | | | 2000 | 2000 | | | | 277 | 321 |
| | | | | 2000 | | 600 | | | 276 | 321 |
| | | | | 2000 | | 2000 | | | 277 | 319 |
| | | | | | | | | 1000 | 280 | 319 |
| | | | | | | | | 2000 | 285 | 323 |

TABLE XVI-continued

| STABILIZER (PPM) | | | | | | | | | WEIGHT LOSS TEMPERATURE (DEGREES C.) | |
|---|---|---|---|---|---|---|---|---|---|---|
| 1 | 2 | 3 | 4 | 5 | 6 | 7 | 8 | 9 | 1% | 10% |
|  |  |  |  |  |  | 4000 |  |  | 291 | 329 |
|  |  |  | 100 |  |  | 1000 |  |  | 285 | 329 |
|  |  |  | 300 |  |  | 1000 |  |  | 289 | 331 |
|  |  |  | 100 |  |  | 2000 |  |  | 289 | 327 |
|  |  |  | 300 |  |  | 2000 |  |  | 292 | 335 |
| 600 |  |  |  |  |  | 2000 |  |  | 282 | 325 |
| 1000 |  |  |  |  |  | 2000 |  |  | 288 | 325 |
| 1000 |  |  |  |  |  | 4000 |  |  | 291 | 331 |
| 2000 |  |  |  |  |  | 4000 |  |  | 291 | 331 |
|  |  |  |  |  |  |  | 2000 |  | 278 | 318 |
|  |  |  |  |  |  |  |  | 2000 | 278 | 322 |
| 1000 |  |  |  |  |  |  | 2000 |  | 277 | 316 |
|  |  |  |  | 300 |  |  | 2000 |  | 285 | 326 |
| 1000 |  |  |  |  |  |  |  | 2000 | 280 | 321 |
|  |  |  |  |  | 600 |  |  | 2000 | 286 | 327 |

EXAMPLE 69

This example illustrates the preparation of a larger amount of graft copolymer to be used in many of the following studies. The process and composition of Example 52 was followed with some variations. Several preparations were combined. In all but the last of these preparations, radicals are generated at the rate of 0.000070 moles per liter per minute (radical flux). Monomer and initiator are fed over 120 minutes and the theoretical (100%) conversion) solids at the end of the reaction is 50%.

A 380-liter reactor equipped with a pitched-blade turbine agitator was charged with 86.4 kg of the hydrocarbon solvent and 34.5 kg of polypropylene homopolymer, mfr=4. After deoxygenating (applying vacuum to degas, followed by pressurizing with nitrogen to atmospheric pressure) through three cycles, it was pressurized to 103 kPa with nitrogen and heated to 150° C. over 2 hours. A pressure of 241 kPa was maintained while the batch was held at 150° C. for 3 hours. Two solutions were added over a fifteen minute period. The first consisted of 59 g of DTBPO in 841 g of the hydrocarbon solvent. The second consisted of 0.32 kg of ethyl acrylate and 6.14 kg of methyl methacrylate. Addition of the first solution was then continued at a lower rate to feed an additional 103 g of DTBPO and 1479 g of the hydrocarbon solvent over 105 minutes. At the same time the monomer addition of 2.26 kg of ethyl acrylate and 43.0 kg of methyl methacrylate was continued over 105 minutes. Reaction exotherm increased the temperature to about 160° C. After the feed was complete, 5 kg of the hydrocarbon solvent was fed into the reaction mixture.

The reaction mixture was held in the reaction kettle for an additional 30 minutes. It was then transferred to a second kettle which was also under pressure at 150° C. During the transfer a solution of 80 g of di-tertiary dodecyl disulfide in 320 g of the hydrocarbon solvent was added to the second kettle. Also during this transfer three 4.53 kg portions of the hydrocarbon solvent were fed into the reaction kettle. Material in this second kettle was fed to a 20.3-mm Welding Engineers twin-screw extruder where devolatilization occured.

During the devolatilization the next batch was prepared in the reaction kettle. It was transferred to the extruder feed kettle while extrusion continued. In this manner several batches were made in a "semi-batch" manner, that is, batchwise in the reactor with continuous feed to the extruder.

In the final preparation of the blend, radical flux was 0.000050 (42 g DTBPO+858 g of the hydrocarbon solvent in the first feed, 73 g DTBPO+1502 g of the hydrocarbon solvent in the second feed).

The final blend, designated Example 69, was prepared by blending pellets from 13 batches prepared as described and one batch of the final variant. All samples from individual batches gave acceptable sag resistance when tested in polypropylene.

EXAMPLE 70

The following example illustrates that improved stability can be imparted to the graft copolymers of the present invention by copolymerization of an alkylthioalkyl monomer, specifically ethylthioethyl methacrylate.

The stability of graft copolymers prepared with alternate monomer compositions was also evaluated. All were prepared according to the procedure for Example 4, except that the monomer composition varied and the product was isolated by evaporating solvent instead of by devolatilizing in an extruder. The monomer compositions and the TGA results are summarized in the table below. The abbreviation EA indicates ethyl acrylate; MMA=methyl methacrylate; ETEMA=ethylthioethyl methacrylate and MA=methyl acrylate. Weight loss (%) is the temperature at which the particular percent weight loss is observed, utilizing a DuPont ThermoGravimetric Analyzer at a heating rate of 20° C. in nitrogen.

TABLE XVII

| Grafted Acrylic Polymer | Temperature at Which Noted Percent Weight Loss Occurs by TGA Analysis (°C.) | | | |
|---|---|---|---|---|
|  | 1% | 2% | 5% | 10% |
| 95% MMA, 5% EA | 221 | 274 | 307 | 333 |
| 95% MMA, 5% EA + 0.05% ETEMA | 260 | 289 | 314 | 346 |
| 95% MMA, 5% EA + 0.25% ETEMA | 281 | 305 | 335 | 360 |
| 95% MMA, 5% MA | 254 | 290 | 317 | 325 |

EXAMPLE 71

This example illustrates that an alternative method reported for the preparation of methacrylic ester/-

/polyolefin graft copolymers does not produce a polymer useful in improving resistance to sagging of polypropylene. Example 2 of U.S. Pat. No. 2,987,501 was repeated, wherein linear low-density polyethylene homopolymer (mfr=2.3) was immersed in fuming nitric acid for 30 minutes at 70° C., removed, washed with water, and dried. The treated polyethylene was then suspended over refluxing methyl methacrylate for 4 hours. The polymer was extracted with methyl ethyl ketone, as taught in the reference, to remove ungrafted poly(methyl methacrylate). The molecular weight of the ungrafted polymer was determined by gel permeation chromatography to be Mw=430,000, Mn 170,000.

TABLE XVIII

| Weight of polyethylene, g. | Weight before reaction (after nitration), g. | Weight after reaction and extraction, g. | Weight of polymer extracted, g. |
|---|---|---|---|
| 3.397 | 3.48 | 5.964 | 4.40 |

Thus, the graft copolymer formed was 43% PMMA and 57% PE. The total sample prior to extraction was 67% PMMA, 33% PE, and the efficiency of grafting of the PMMA was 63.1%.

The resultant graft polymer, from which the ungrafted polymer had not been removed, was blended at the 4% level into the polypropylene resin of mfr=4 used as a standard for testing sag resistance. The graft copolymer of this example did not disperse well, and visible, large, undispersed fragments were seen. The sag value (0.31) was worse than for the unmodified resin (0.18) or for resin modified with an equivalent amount of the graft copolymer of Example 69 (0.02).

The graft copolymer of this example was also milled into linear low-density polyethylene (mfr 2.3) in the manner taught in Example 59. Poor dispersion in polyethylene was also noted, with large chunks of the undispersed modifier visible. Sag resistance was determined at 150° C. as in Example 59; sag for the unmodified control (by the sag slope test) was 0.39, and for the graft copolymer of this example, 0.23. By comparison, sag when using the graft copolymer of Example 4 would be expected to be well below 0.10.

EXAMPLES 72-77

This example illustrates preparation of blends of graft copolymer with polypropylene resins to form pellets useful for further processing into extruded or molded articles.

The graft copolymer of Example 69, not separated from any ungrafted polypropylene or acrylic polymer, was used as 3.2-mm-long pellets cut from an extruded strand.

The polypropylene resins used were Aristech T1-4020F (Aristech Chemical Corporation, Pittsburgh, Pa.), Himont 6523 (Himont Corporation, Wilmington, Del., and Rexene 14S4A (Rexene Corporation, Dallas, Tex.). Characteristics are shown in Table XIII; the term "copolymer" in the table means a copolymer with ethylene.

The graft copolymer was blended at 5% with the polypropylene resins by tumbling. The blend was then extruded into strands through an Egan 60-mm, twin-screw extruder equipped with screws of 32:1 length-/diameter ratio; the strands were cooled and chopped into pellets. Various feed rates and screw speeds were utilized. Conditions for the unmodified and modified resins used to obtain large-scale samples are summarized in Table XIV. Sag tests as described in Example 1 were conducted on several other samples of modified resin processed under varying conditions, and the results were comparable to those reported below in Table XIX.

TABLE XIX

Blends of Polypropylene With Methyl Methacrylate Graft Copolymer and Controls

| Example | Ex. 69 Graft, phr | Polypropylene Matrix Resin Name | MFR | Composition | Sag |
|---|---|---|---|---|---|
| 72 | — | Aristech TI-4020F | 2 | copolymer | 0.23 |
| 73 | 5 | | | | 0.02 |
| 74 | — | Himont 6523 | 4 | homopolymer | 0.36 |
| 75 | 5 | | | | 0.11* |
| 76 | — | Rexene 14S4A | 4 | copolymer | 0.35 |
| 77 | 5 | | | | 0.14 |

*Sample tore on testing; other blends processed at slightly different conditions gave sags of 0.06 to 0.09.

TABLE XX

Processing Conditions for Pre-Blends of TABLE XIX

| Example: | 72 | 73 | 74 | 75 | 76 | 77 |
|---|---|---|---|---|---|---|
| Modifier: | — | 5% | — | 5% | — | 5% |
| Feed Rate, kg/hr (Set) | 90.7 | 181.4 | 90.7 | 181.4 | 181.4 | 181.4 |
| Feed Rate (actual) | 90.2 | 185 | 89.8 | 181.4 | 178.7 | 182.3 |
| Screw Speeds | 101 | 200 | 100 | 200 | 200 | 200 |
| Drive Amps | 103 | 121 | 97 | 111 | 112 | 112 |
| Kg-m/s[1] | 1258 | 3033 | 1184 | 2811 | 2811 | 2811 |
| Head Pressure (kPa) | 2137 | 2758 | 1448 | 2068 | 2275 | 2206 |
| Barrel Temps. (°C.) | | | | | | |
| Zone 1 | 163 | 163 | 163 | 163 | 163 | 163 |
| Zones 2-8 | 204 | 204 | 204 | 204 | 204 | 204 |
| Die | 204 | 204 | 204 | 204 | 204 | 204 |
| Melt Temp. °C. | 213 | 222 | 208 | 216 | 217 | 217 |

[1]Power applied to extruder screw.

EXAMPLES 78-83

This example illustrates preparations of blends of graft copolymer with other polypropylene resins on different compounding equipment to form pellets useful for further processing into film or profile. The Amoco 6214 is a film grade polypropylene resin containing a clarifier. The Eastman 4E11 is an impact-extrusion grade, propylene-ethylene-copolymer resin used in profile extrusion. In the present case, both 1% and 5% by weight of the graft copolymer described in Example 69 were used to form the blends.

The two polymers were tumble blended, and the mixtures fed to an 83 mm Werner-Pfleiderer co-rotating, intermeshing, twin-screw extruder of 24/1 l/d ratio. The pellets were continuously fed to the extruder by means of an Acrison "loss-in-weight feeder", melted and mixed in the extruder, extruded through a 33-strand die, cooled in a water trough, dried, pelletized, and packaged. The machine conditions for the individual batches are as follows:

TABLE XXI

Compositions of Blends and Matrix Polymers

| Example | % Modifier | Matrix Polymer |
|---|---|---|
| 78 | — | Eastman 4E11 Copolymer |
| 79 | 1 | |
| 80 | 5 | |
| 81 | — | Amoco 6214 Homopolymer |
| 82 | 1 | |

TABLE XXI-continued

Compositions of Blends and Matrix Polymers

| Example | % Modifier | Matrix Polymer |
|---|---|---|
| 83 | 5 | |

TABLE XXII

Preparative Conditions for Various Blends of TABLE XXI
Temperature, °C.

| | Zone | set point/actual | Conditions | |
|---|---|---|---|---|
| Ex. 79 | Z-1 | 229/229 | RPM- | 125 |
| | Z-2 | 235/216 | TORQUE- | 73–75% |
| | Z-3 | 249/227 | FEED SET- | 65 |
| | Z-4 | 213/302 | VACUUM- | 380 mm Hg |
| | Z-5 | 235/221 | MELT TEMP.- | 227° C. (STRANDS) |
| | Z-6 (DIE) | 227/227 | RATE- | 150 kg/hr |
| | Z-7 (DIE) | 238/241 | | |
| Ex. 80 | Z-1 | 229/229 | RPM- | 125 |
| | Z-2 | 235/216 | TORQUE- | 73–75% |
| | Z-3 | 249/235 | FEED SET- | 65 |
| | Z-4 | 213/302 | VACUUM- | 355–380 mm Hg |
| | Z-5 | 235/232 | MELT TEMP.- | 205–207° C. |
| | Z-6 | 241/241 | RATE- | 218 kg/hr |
| | Z-7 | 238/238 | | |
| Ex. 82 | Z-1 | 288/288 | RPM- | 90 |
| | Z-2 | 296/304 | TORQUE- | 50–53% |
| | Z-3 | 299/260 | FEED SET- | 50 |
| | Z-4 | 252/316 | VACUUM- | 203–253 mm Hg |
| | Z-5 | 293/293 | MELT TEMP.- | 223° C. |
| | Z-6 | 266/232 | RATE- | 116 kg/hr |
| | Z-7 | 268/266 | | |
| Ex. 83 | Z-1 | 288/285 | RPM- | 90 |
| | Z-2 | 293/272 | TORQUE- | 50–56% |
| | Z-3 | 299/254 | FEED SET- | 50 |
| | Z-4 | 224/310 | VACUUM- | 304–329 mm Hg |
| | Z-5 | 266/249 | MELT TEMP.- | 226° C. |
| | Z-6 | 266/229 | RATE- | 122 kg/hr |
| | Z-7 | 268/272 | | |

EXAMPLES 84–87

This example illustrates the use of a graft copolymer of the present invention in the preparation of bottles from polypropylene materials.

The graft polymer of Example 69 was blended at various levels up to 5% by weight with either of two commercial polypropylenes used for blow molding of bottles. The matrix polymer of Example 84 was a propylene random copolymer believed to contain 2–4% ethylene, supplied by Fina Oil & Chemical Co., Dallas, Tex., as Fina 7231, mfr=2. The matrix polymer of Example 86 was a propylene homopolymer, mfr=2, supplied by Quantum Chemical, USI Division, Rolling Meadows, Ill. as Norchem 7200GF. Blends were made by tumbling the resins.

Samples were injection blow molded on a Jomar machine, model 40, (Jomar Corporation, Pleasantville, N.J.). The resin blend, in melt form, was injected into a four-cavity mold (two cavities being blocked off) over a core pin with an air hole at the end to form an inflatable parison. The mold was heated and was designed to produce a pattern at the far end which will allow a cap to be attached after molding. Temperatures of the mold were controlled at the bottle neck, bottle walls, and bottle bottom. The parisons were conveyed to a second station where they were inflated to form the bottle shape, and then to a third station where they were cooled and removed. Bottles, which were a 103.5 ml spice bottle, were judged versus non-modified controls for surface gloss, clarity, uniformity of thickness, wall strength, and the like, as well as to the ease of molding.

TABLE XIII

Molding Conditions for Bottles

| | | | Temperatures, °C. | | | |
|---|---|---|---|---|---|---|
| Example | Resin | Graft, % | Melt | Bottom | Wall | Neck |
| 84 | 84 | — | 243 | 77.7 | 104 | 48.9 |
| 85 | 84 | Ex. 69, 5% | 249 | 82.2 | 110 | 48.9 |
| 86 | 86 | — | 243 | 77.7 | 104 | 48.9 |
| 87 | 86 | Ex. 69, 5% | 249 | 82.2 | 110 | 48.9 |

When bottles from Example 85 were compared with their controls from Example 84, a slight improvement in gloss, notable increase in contact clarity, and noticeable improvement in stiffness were observed. Similar advantages over the control were seen with at a 1% level of the graft polymer with the matrix resin of Example 84. The clarity effect was not seen with bottles from Example 87 over control Example 86.

For reasons not fully understood, the same additive at 5% was deleterious to the formation of bottles from homopolymer or copolymer of higher melt flow rate, even with appropriate adjustments in processing temperatures; much of the problem was associated with poor dispersion of the modifier. Such poor dispersion has not been seen in other compounding, processing or testing operations. Slightly stiffer bottle of improved gloss could be blown with the graft polymer additive at 0.5 weight percent, relative to a control with no additive A pre-blend (Example 73) of 5% graft copolymer with another mfr=2 high-impact copolymer yielded bottles with severe material non-uniformity. A dry blend of 0.5% graft copolymer with this same resin (the resin of Example 72) gave bottles with improved gloss and contact clarity.

EXAMPLES 88–94

These examples illustrate the utility of a graft polymer of the present invention in the preparation of polypropylene foam and foamed sheet. In the examples, a homopolymer of polypropylene (Example 72), mfr=2, a pre-blend (Example 73) of that polypropylene with a methacrylate//polypropylene graft copolymer, and a mixture of the Example 73 pre-blend with 1% talc (designated Example 88) were employed; into all pellets were blended Ampacet 40104 to incorporate a blowing agent. Ampacet blowing agent is a 10%-active, proprietary chemical blowing agent dispersed in polyethylene. It is supplied by Ampacet Corporation, 250 South Terrace Avenue, Mt. Vernon, N.Y. 10550. When 10 parts of Ampacet are blended, there is 1 part proprietary blowing agent in the formulation.

The polymer mixture was processed in a 25.4-mm, single-screw extruder produced by Killion Extruders Corporation, utilizing a 24:1 length/diameter screw of 4:1 compression ratio, and a 1-mm-diameter rod die. Extrusion conditions are summarized below. The unmodified polymer exhibited severe fluctuations in die pressure (6900–12,400 kPa); the blend containing 5 parts of the graft copolymer could be extruded at a constant die pressure. In both cases good cell uniformity was observed. Uniform larger cells were noted in the graft-polymer-modified blend when the amount of active foaming ingredient was increased to 2%. The presence of 1% talc in the modified polyolefin produced the best cell structure and fastest line speed.

Foam densities of the rods were measured according to ASTM Standard Method D-792, Method A-L. Although the unmodified matrix polymer produced the lowest-density foam, the modified polymer foams in general had a regular foam-cell structure.

The three materials were also processed on a similar line with a 202-mm cast film die and a heated collecting roll to yield foamed sheet; here no significant differences in processing were seen among the three resin blends. The individual sample preparations and results are shown in Table XXIV below.

TABLE XXIV

| Type: | Rod | Rod | Rod | Sheet | Sheet | Sheet |
|---|---|---|---|---|---|---|
| Sample: | Ex. 89 | Ex. 90 | Ex. 91 | Ex. 92 | Ex. 93 | Ex. 94 |
| Polymer of: | Ex. 72 | Ex. 73 | Ex. 88 | Ex. 21 | Ex. 73 | Ex. 73 |
| Talc, wt % | — | — | 1 | — | — | — |
| Foaming agent, wt % | 1 | 1 | 1 | 1 | 1 | 1 |
| Extruder rpm | 80 | 80 | 80 | 75 | 75 | 75 |
| Melt temp., °C. | 214 | 208 | 209 | 227 | 227 | 227 |
| Melt pressure, kg/cm$^2$ | 70–127 | 127 | 140 | 56 | 42 | 42 |
| Puller speed, meters/min | 13 | 15 | 23 | | | |
| Sample Density, g/cm$^3$ | 0.469 | 0.664 | 0.733 | | | |

EXAMPLES 95–98

This example illustrates the utility of a graft copolymer of polypropylene/methyl methacrylate in the preparation of blown polypropylene film. Film was blown from the control polypropylene homopolymer of Example 74, the pre-blend of Example 75 which contained 5 weight percent of the graft copolymer of Example 69, and dry blends of the propropylene of Example 74 with 1 and with 5 parts of the graft copolymer of example 69.

Blown film was produced on a Killion blown film line (Killion Extruders Co., Cedar Grove, N.J.), which consists of a 25.4-mm, single-screw extruder operating at a melt temperature of about 216° C., a 50-mm spiral mandrel die, air input for producing a bubble, and a Killion vertical-blown-film tower. The blown-film tower contains two nip rolls for collapsing the bubble and a means for pulling the film through the nip rolls. The die and pull speeds are adjusted to produce film about 5.6 mm thick (two thicknesses) and either 108 or 165 mm wide, the blow-up ratios being 2.125 and 3.25 respectively, at respective top nip speeds of 7.65 and 5.94 meters/minute.

TABLE XXV

| Film of Example | Materials | Thickness |
|---|---|---|
| Ex. 95 | Ex. 74; no GCP | 0.051–0.066 |
| Ex. 96 | Ex. 75; 5% GCP, Cmpd. | 0.056–0.064 |
| Ex. 97 | Ex. 74; 5% GCP, Dry Blend | 0.051–0.058 |
| Ex. 98 | Ex. 74; 1% GCP, Dry Blend | 0.051–0.058 |

Himont 6523, mfr=4, homopolymer polypropylene was blown into 0.025-mm-thick film (single layer) as Example 95 (control). The bubble was sligthly lopsided, and the frostline (onset of crystallization) was at an angle to the die. A lopsided bubble results in less uniform film thicknesses.

With 5% of the graft copolymer of Ex. 69 present, the bubble of Example 96 was stabilized, the frostline levelled, and the frostline moved closer to the die. Both 108- and 165-mm, lay-flat films were produced. Although some fluctuation in die pressure was noted when forming the latter film, it had the most stable bubble.

This increase in bubble stability was also observed with the 1% and 5% dry blends of Examples 97 and 98. No significant differences in film appearance was observed between the 5% precompounded blends and the dry blends.

The modified films had decreased film see-through clarity. Contact clarity remained unchanged. No difference in edge-roll color was observed between modified and unmodified film.

The "openability" of neat and modified film was tested. Although a very qualitative test (the collapsed film is snapped between the fingers and one feels how well it opens), no difference between the unmodified and modified resins was observed.

EXAMPLES 99–104

The experiments illustrate the use of the graft polymer of the present invention in producing polypropylene cast film. A single-screw extruder, manufactured by Killion co., was equipped with a 3.81-cm screw of 24/1 length/diameter ratio, a 20.3-cm×0.635-mm cast film die, a chill roll and a torque winder for the film, was utilized. The extruder melt temperature was 226° C. The melt was extruded through the die and onto the chill rolls, the take-up speed being adjusted to produce film of various thicknesses. Film thicknesses was measured, as was "neck-in", an undesirable shrinkage of width. Film stiffness and edge roll color were measured qualitatively. Film thicknesses were adjusted increasing line speed of the torque winder and lowering the extruder output by reducing screw speed.

TABLE XXVI

| Film of Example | Starting Material | Form |
|---|---|---|
| Ex. 99 | Ex. 74 | Unmodified |
| Ex. 100 | Ex. 75 | Pre-blend; 5% GCP |
| Ex. 101 | Ex. 74 and Ex. 69 | Dry Blend; 5% GCP |
| Ex. 102 | Ex. 81 | Unmodified |
| Ex. 103 | Ex. 82 | Pre-blend; 1% GCP |
| Ex. 104 | Ex. 83 | Pre-blend; 5% GCP |

GCP = graft copolymer of Example 69

Films of the composition of Example 99 were uniform and consistent at thicknesses of from 0.25 mm to below 2.5 mm. Example 100 produced acceptable film of improved edge color and with less film neck-in. Example 101 also produced less neck-in, but did not improve edge color. Both modified versions yielded stiffer films at equivalent thickness versus the control, allowing the film to be wound more easily. The opacity of the film increased with the addition of the graft polymer.

With Examples 102 to 104, the neck-in differences were not noted when the graft copolymer was present. The films at both 1 and 5 weight percent graft copolymer were stiffer than the unmodified control (Examples 103 and 104 versus Example 102).

EXAMPLE 105

This example illustrates that biaxially oriented film can be prepared from a polypropylene resin containing 5% of the polypropylene/methyl methacrylate graft copolymer. Under the limited conditions tested, which were optimum for the unmodified resin, no distinct advantage could be seed for the additive. At identical extrusion and MDO (machine direction orientation)

conditions, the modified resins could not achieve and maintain the line speeds possible with the unmodified resin during the TDO (transverse direction orientation).

The control resin was Example 81, mfr=2.2, high-clarity homopolymer marketed for film use. Pre-compounded resins were Examples 82 and 83, containing respectively 1% and 5% of the graft copolymer of Example 69 (under the extrusion conditions, a dry blend of 5 parts graft copolymer of Ex. 69 with the matrix resin of Example 81 gave very poor dispersion, leading to many gels and frequent film breaks). The blends were processed in a 50.8-mm, Davis-Standard single-screw extruder which conveyed the melt through a 0.48-meter die and onto a 1.02-meter casting roll. An air knife was used to blow the extrudate onto the casting roll. The casting roll rotated through a water bath to completely quench the sheet. The sheet then was conveyed into the MDO, supplied by Marshall and Williams Co., Providence, RI, and comprising a series of heated nip rolls, moving at speeds which cause monoaxial orientation. After the MDO, the film passed through a slitter to cut the film to the proper width and then onto a winder. These rolls were used to feed the film into the TDO, which is an oven with three heating zones, rolls for conveying the film forward, and clamps to grip and laterally expand the film.

The film from Example 81 (unmodified resin) was drawn both 4.75:1 and 5.0:1 in the MDO, and could be drawn 9:1 in the TDO. The unmodified 4.75:1 MDO resin could maintain a TDO line speed of 8.69 meters/minute; the unmodified 5.0:1 MDO resin could maintain a line speed of 6.85 meters/minute.

The film from Example 82 (1% graft copolymer) could receive a MDO of 4.75:1 and TDO of 9:1 and maintain a 6.85-meters/minute TDO line speed. Frequent film breakage was encountered at higher MDO and higher line speeds. This biaxially oriented film appeared to be slightly more opaque than the biaxially oriented film from Example 80. No difference between the edge roll colors of film from Examples 81 and 82 was observed for MDO film.

The films from Example 83 received MDO's of 4.75:1, 5.0:1, and 5.25:1 at a TDO of 9:1. The best film was obtained with a line speed of 6.85 meters/minute and with the lowest MDO; tearing would occur under more stressed conditions. Films from Example 83 were noticeably more opaque and the frost line appeared sooner than with the control film of Example 81.

EXAMPLE 106

This example illustrates a profile extrusion trial using polypropylene modified with a graft copolymer of the present invention. A single-screw extruder was equipped with a die and appropriate cooling, pulling, and sizing equipment to form a profile in the shape of a solid rod with horizontal flanges. The rod diameter was 4.83 cm., flanges 2.67 cm. (extended beyond rod), and flange thickness 1.52 cm. With unmodified resin (Tenite 4E11 copolymer, Eastman Chemical, as described in Example 78), symmetry was difficult to maintain in the profile without sag or distortion. When blends of Example 79 and 80 (1 and 5% graft copolymer, respectively) were employed, the maintenance of shape was improved.

EXAMPLE 107

This example illustrates the use of a graft copolymer blend of the present invention in the modification of polypropylene to produce improved plastic tubing. The polymers used were the unmodified resins and the resins compounded with 5% of the graft copolymer of Ex. 69, as described in Examples 72 to 77.

A 25.4-mm, single-screw Killion Extruder (Killion Extruders Co., Cedar Grove, N.J.) was equipped with a screw of 24/1 length/diameter ratio, a tubing die with an outer die diameter of 11.4 mm. and a variable inner diameter, leading to a 0.25-meter-long water trough for cooling, an air wipe, and a puller and cutter. Conditions and observations are shown in Table below. Ovality is the ratio of smallest outer diameter to largest outer diameter, as measured by calipers; a value of 1 means the tube is uniformly round.

When tubing of good ovality was produced from the unmodified resin, the major effect of the additive was improvement in tubing stiffness. With the resin of Example 72, where ovality was difficult to control at acceptable output rates, the modified resin (Example 73) improved ovality as well as stiffness.

TABLE XXVII

Tubing Prepared from Polypropylene and Modified Polypropylene

| Polymer | Melt Temperature, °C. | Melt Pressure, kPa(a) | Inner Diameter mm(set) | Ovality |
|---|---|---|---|---|
| Ex. 72 | 217 | 8270 | 8.1 | 0.75 |
| Ex. 73 | 214 | 6890 | 8.1 | 0.88 (b) |
| Ex. 74 | 185 | 9650 | 8.1 | 0.97 |
| Ex. 75 | 197 | 6890 | 8.1 (c) | 0.77 |
| Ex. 76 | 184 | 6890 | 8.1 (d) | 0.92 |
| Ex. 77 | 180 | 8270 | 8.1 (d) | 0.90 (b,e) |

(a)Extrusion rate equivalent for paired unmodified and modified resin.
(b)Modified extrudate tube stiffer.
(c)Higher melt temperature required to avoid "sharkish" on tubing.
(d)With this higher mfr resin, reduced melt temperature and higher puller speed led to tubing of lower outer diameter.
(e)Modified tubing more opaque.

EXAMPLES 108–109

This example illustrates the preparation of pre-compounded blends containing talc. The talc used is a white, soft, platy talc of particle size less than 40 μm, known as Cantal MM-45-90 (Canada Talc Industries Limited, Madoc, Ontario). It was used at the 20% level. The polypropylene used was a homopolymer of mfr=4, known as Himont 6523. The graft copolymer was incorporated at the 5-weight-percent level and was the graft copolymer of Example 69. The compounding/preparation of these samples was carried out on a 30-mm Werner-Pfleiderer co-rotating, twin-screw extruder. The materials were tumble blended prior to the compounding.

TABLE XXVIII

| Blend | % Talc | Modifier | Matrix Polymer |
|---|---|---|---|
| Example 108 (control) | 20 Cantal | — | 80% Himont 6523 |
| Example 109 | 20 Cantal | 5% Example | 75% Himont 6523 |

The preparative conditions for the blends are given in Table XXIX. The extruder was operated at 200 rpm, with no vacuum, at rates of 4.5–4.16 kg/hour, and 85–86% torque.

TABLE XXIX

| | Extruder Zone Settings, °C. | |
|---|---|---|
| Zone | Example 108 set point/actual | Example 109 set point/actual |
| Z-1 | 125/148 | 125/151 |

TABLE XXIX-continued

| | Extruder Zone Settings, °C. | |
|---|---|---|
| Zone | Example 108 set point/actual | Example 109 set point/actual |
| Z-2 | 220/218 | 220/219 |
| Z-3 | 230/228 | 230/229 |
| Z-4 | 230/242 | 230/241 |
| Z-5 | 240/239 | 240/239 |
| Z-6 | 240/239 | 240/239 |
| Z-7 | 240/242 | 240/239 |
| Z-8 (die) | 225/239 | 225/239 |
| Melt | 239 | 243 |

EXAMPLES 110–112

These examples teach the injection moulding of polypropylene of various compositions and melt flow rates, the polypropylenes containing a graft copolymer of the present invention. In two examples, a 20% loading of platy talc is also present.

Polypropylene may be injection molded into useful objects by employing a reciprocating-screw, injection-molding machine such as that of Arburg Maschien Fabrik, Lossburg, Federal Republic of Germany, Model 221-51-250. In the preparation of test samples, the extruder is equipped with an ASTM mold which forms the various test pieces. The conditions chosen for molding were unchanged throughout the various matrix and modified matrix polymers, and no difficulties in molding were noted. Table XXX describes the blends which are molded; Table XXXI teaches the molding conditions; Table XXXII reports modulus values, Table XXXIII Dynatup impact data, and Table XXXIV heat distortion temperature values fo the modified polymers and their controls.

In the following list of injection-molded polymers and blends, all samples contain 1 or 5 weight percent of the graft copolymer of Example 69. The polypropylene matrix resins are described in earlier examples; HP is homopolymer, CP is copolymer, the number is the mfr value. The blends with talc are described in Examples 108 and 109. All materials were pre-blended in the melt, except where a dry blend from powder was directly molded. (C) is an unmodified control; (CT) is a control with talc, but no graft copolymer.

All test methods were by ASTM standard methods: flexural modulus and stress are by ASTM Standard Method D 790, heat distortion temperature under load is by ASTM Standard Method D 648 and Dynatup impact is by ASTM Standard Method D 3763.

Table XXX also includes the melt flow rates (mfr) for the unmodified and pre-compounded blends. In most cases, the melt flow rate is unchanged or slightly decreased in the presence of the graft copolymer, so that the melt viscosity under these intermediate-shear conditions is not extensively increased. The melt flow rate is by ASTM Standard Method D-1238, condition L (230° C., 298.2 kPa) and has units of grams extruded/10 minutes.

TABLE XXX

| Example | Matrix | Graft, % | Talc, % | Dry-Blend? | mfr |
|---|---|---|---|---|---|
| 74 (C) | HP, 4 | — | — | — | 4.40, 4.06 |
| 75 | HP, 4 | 5 | — | — | 6.07 |
| 110 | HP, 4 | 5 | — | YES | |
| 108 (CT) | HP, 4 | — | 20 | — | |
| 109 | HP, 4 | 5 | 20 | — | |
| 76 (C) | CP, 4 | — | — | — | 4.47 |
| 77 | CP, 4 | 5 | — | — | 3.75 |
| 111 | CP, 4 | 5 | — | YES | |
| 72 (C) | CP, 2 | — | — | — | 2.37 |
| 73 | CP, 2 | 5 | — | — | 2.02 |
| 112 | CP, 2 | 5 | — | YES | |
| 78 (C) | CP | — | — | — | 2.92 |
| 79 | CP | 1 | — | — | 2.04 |
| 80 | CP | 5 | — | — | 2.12 |
| 81 (C) | CP | — | — | — | 2.33 |
| 82 | CP | 1 | — | — | 3.81 |
| 83 | CP | 5 | — | — | 2.16 |

TABLE XXXI

| Injection Molding Conditions for Propylene | | | |
|---|---|---|---|
| Cylinder temperatures, °C. | | (setting/measured) | |
| Feed | —216/216 | Metering | —216/216 |
| Compression | —216/216 | Nozzle | 216/216 |
| | Mold Temperatures, °C. | | |
| Stationary | —49/49 | Moveable | —49/49 |
| | Cycle time, seconds | | |
| Injection forward | —14 | Mold Open | —0.5 |
| Cure | —14 | Total Cycle | —0.5 |
| Mold Closed | —1.2 | | |
| Machine readings: | | | |
| Screw speed (rpm) - 400 | | | |
| Back pressure (kPa) - 172 | | | |
| Injection (1st stage) (kPa) - 861 | | | |

The flexural modulus data from Table XXXII indicate the stiffening effect of the graft copolymer. Results are in megapascals (mPa).

TABLE XXXII

| Example | FLEXURAL MODULUS mPa | STRESS (at max) mPa |
|---|---|---|
| 74 (C) | 1470.6 | 43.8 |
| 75 | 1744.4 | 47.5 |
| 110 | 1783.1 | 46.9 |
| 108 (CT) | 2768.0 | 52.0 |
| 109 | 2867.0 | 54.5 |

Table XXXIII summarizes Dynatup impact data (in Joules) at various temperatures for the blends and controls tested. The data indicate, in general, slightly improved impact for the pre-blended materials, a deterioration in impact strength on molding dry blends of graft copolymer and matrix polymer, and an increase in impact strength for the talc-modified blend also containing the graft copolymer.

TABLE XXXIII

| | Dynatup Impact (joules) at Test Temperature, °C. | | | |
|---|---|---|---|---|
| Example | 23 | 15 | 5 | −5 |
| 74 (C) | 4.9 ± 2.7 | 4.4 ± 1.5 | 3.8 ± 0.3 | 2.6 ± .41 |
| 75 | 5.7 ± 3.4 | 4.6 ± 0.8 | 2.7 ± 1.5 | 3.4 ± 1.09 |
| 110 | 3.4 ± 1.1 | 2.0 ± 0.5 | 1.9 ± 1.0 | 1.5 ± .41 |
| 108 (CT) | 3.0 ± 0.5 | 3.4 ± 0.8 | 4.2 ± 1.6 | 5.0 ± 2.5 |
| 109 | 1.9 ± 0.5 | 4.1 ± 2.3 | 4.8 ± 1.8 | 5.0 ± 2.5 |
| 76 (C) | 40.0 ± 0.5 | | | |
| 77 | 43.9 ± 0.4 | | | |
| 111 | 14.0 ± 6.4 | | | |
| 72 (C) | 37.9 ± 1.8 | | | |
| 73 | 43.1 ± 10.3 | | | |
| 112 | 32.4 ± 9.5 | | | |
| 78 (C) | 36.7 ± 0.4 | | | |
| 79 | 36.3 ± 1.1 | | | |
| 80 | 37.1 ± 0.7 | | | |
| 81* (C) | 13.3 ± 10.7 | — | 3.3 ± 0.8 | 2.7 ± 0.2 |
| 82 | 4.9 ± 0.7 | — | 3.0 ± 1.4 | 3.0 ± 0.8 |

TABLE XXXIII-continued

| | Dynatup Impact (joules) at Test Temperature, °C. | | | |
|---|---|---|---|---|
| Example | 23 | 15 | 5 | −5 |
| 83 | 7.6 ± 3.7 | — | 3.3 ± 0.8 | 3.5 ± 1.1 |

*The large standard deviation at room temperature is suspect.

Table XXXIV presents heat distortion and hardness values for one series. The modified polymer appears to exhibit a slightly higher heat distortion temperature and hardness, although there are inconsistencies noted. The Rockwell hardness values represent separate determinations on two samples of the material from the indicated example.

TABLE XXXIV

| | Heat Deflection Temperature at 2° C./Minute at | | Rockwell Hardness "C" Scale | |
|---|---|---|---|---|
| Example | 411 kPa | 1645 kPa | | |
| 74 (C) | 110.9 | 61.0 | 58.4 | 56.5 |
| 75 | 113.8 | 63.3 | 60.7 | 59.3 |
| 110 | 117.3 | 68.7 | 57.9 | 46.9 |
| 108 (CT) | 128.2 | 76.8 | 57.3 | 64.7 |
| 109 | 124.7 | 81.9 | 65.4 | 63.7 |

EXAMPLE 113

This examples illustrates the effect of the molecular weight of the polypropylene trunk component of the graft copolymer on the sag modification of polypropylenes of various molecular weights. Graft copolymers were prepared from polypropylene of various melt flow rates. All modifiers were prepared as in Example 58. The 35 mfr polypropylene (Himont PD-701) was run at 65% solids. The 12 mfr polypropylene (Himont Pro-fax 6323) was run at 60% solids. The 4 mfr polypropylene (Himont Pro-fax 6523) and the 0.8 mfr polypropylene (Himont Pro-fax 6723) were run at 55% solids. The molecular weights for the polypropylene base resins, where known, are given in Table XXXV, below.

These were evaluated as melt strength improvers at 4% by weight in several of these same polypropylenes. Standard mill and press conditions were used for all blends, except the 0.8 mfr/0.8 mfr polypropylene blends which were milled at 215° C. and pressed at 215° C. Sag rates were measured by the standard procedures. The sag slope at 190° C. is reported in Table XXXVI, below.

TABLE XXXV

| MW-MFR Data for Polypropylene Base Resin | | | |
|---|---|---|---|
| Molecular-Weight Source | Weight-Average Molecular Weight × 10⁵ | | |
| | 12 mfr PP | 4 mfr PP | 0.8 mfr PP |
| (a) | 3 | 4.3 | 7.1 |
| (b) | 2.45 | 3.05 | 3.5, 4.7 |
| (c) | 0.27* | 0.45* | — |

Source of Molecular-Weight Value:
(a) Supplier's data.
(b) Sheehan et al, J. Appl. Polymer Sci., 8, 2359 (1964).
(c) Mays et al, ibid., 34, 2619 (1987).
*These values are number-average molecular weight.

TABLE XXXVI

| Sag Slope at 190° C. for Olefin Blends (min⁻¹) | | | | |
|---|---|---|---|---|
| | polypropylene base resin (96%) | | | |
| modifier (4%) | 35 mfr PP | 12 mfr PP | 4 mfr PP | 0.8 mfr PP |
| none | 1.6 | 0.52 | 0.25 | 0.099 |
| 35 mfr PP based | 1.8 | 0.52 | 0.23 | 0.074 |
| 12 mfr PP based | 1.2 | 0.41 | 0.034 | <0.02 |
| 4 mfr PP based | 1.0 | 0.16 | 0.022 | <0.02 |
| 0.8 mfr PP based | 0.64 | 0.16 | 0.031 | <<0.02 |

In all cases except where a high-melt-flow base resin was modified with a graft polymer having a trunk of high-flow-rate (low-molecular-weight) polypropylene, sag improvement was observed. The molecular weight for the resin of mfr=35 is not accurately known; it is believed to be made by thermal/oxidative processing of a higher molecular weight resin. Such a process would both lower the molecular weight and narrow the originally broad molecular weight distribution.

EXAMPLE 114

This example illustrates the effectiveness of the graft copolymes of the present invention as compatibilizing agents for polymers that are otherwise poorly compatible. In this example of a polyolefin, a polar polymer, and the graft copolymer of the present invention were compounded in an intermeshing, co-rotating, twin-screw extruder (Baker-Perkins MPC/V 30) with a screw length-to-diameter ratio of 10:1. The compounder was run at 200 rpm and temperatures were adjusted to accommodate the polymers in the blend and achieve a good melt. The melt temperature in the compounding zone is recorded in the second column of the table. The melt was fed directly to a 38-mm, single-screw, pelletizing extruder with a length-to-diameter ratio of 8:1. The melt temperature in the transition zone between the compounding and the pelletizing extruder is shown in column 3 of Table XXXVIII, below. The melt was extruded into strands through a die, cooled in a water bath, and cut into pellets.

Table XXXVII below summarizes the polymerw which were used in the blends of the present example, while Table XXXIX shows that the graft copolymer has little effect upon the tensile strength of the unblended polymers, that is, it does not act to a significant degree as a toughening agent. In the subsequent tables, Tables XL and XLI, improvement in tensile strength of the blended polymers indicates an increase in compatability of the blended polymers with one another in the presence of the graft copolymers of the present invention.

Under the proper compounding conditions, an increase in compatibility may also produce a decrease in the size of polymer domains in the blend. Scanning electron microscopy confirms that in some of these examples, significant domain-size reductions occur when the graft copolymer is added. For example, the polypropylene domains average 2 micrometers in the 70 PMMA/30 PP blend of example 114. The addition of 5 phr compatibilizer reduced the domain size to 0.5 μm. The addition of 15 phr compatibilizer reduced the domain size to 0.43 μm. Although not all of the domain sizes were reduced, several others were reduced by 10–30% by the addition of 5 phr compatibilizer. This is a further suggestion that the compatibilizer is acting on the interface of the polymer domains rather than on the individual polymers.

Table XLI summarizes the compatibilizing effect of the graft copolymers upon the various polymer blends.

TABLE XXXVII

Polymers Used in the Blend Examples

| Polymer and Designation in Tables | Producer | Grade Designation | Spec. Grav. | Other Specifications |
|---|---|---|---|---|
| SAN Styrene-Acrylonitrile Polymer | Monsanto | Lustran SAN 33 | 1.07 | mfr = 14 ASTM D 1238 Cond. (I) |
| PA66 Nylon 6.6 | DuPont | Zytel 101 | 1.14 | mp = 255° C. (D2117) |
| PET Polyethylene Terephthalate | Eastman Kodak | Kodapak PET 7352 | 1.4 | mp = 245° C. (DSC), iv = 0.74 |
| EVOH Ethylene Vinyl Alcohol Copolymer | EVAL Co. of America | Eval EP-E105 | 1.14 | 44 moles % E, mp = 164 C, mfr = 5.5 (190° C., 2160 g) |
| PC Polycarbonate | General Electric Plastics | Lexan 121 | 1.20 | mfr = 16.5 ASTM D 1238 Cond. (O) |
| PVC Polyvinyl Chloride | Georgia Gulf Corp. | SP-7107 | 1.35 | |
| PMMA Poly (Methyl Methacrylate) | Rohm and Haas Co. | Plexiglas VM | 1.18 | mfr = 15 |
| EP Ethylene Propylene Copolymer | Exxon | Vistalon 719 | 0.89 | 54 Mooney (D-1646) |
| HDPE High-Density Polyethylene | Phillips 66 Co. | Marlex HMN 5060 | 0.950 | mfr = 4 |
| PP Polypropylene | Himont | Pro-fax 6523 | 0.903 | mfr = 4 |
| EVA Ethylene Vinyl Acetate | DuPont | Elvax 650 | 0.933 | 12% VA mfr = 8 |
| LLDPE Linear Low-Density Polyethylene | Exxon | Escorene LL-6202 | 0.926 | mfr = 12 |
| PS Polystyrene | Huntsman Chemical | PS-203 (crystal) | 1.06 | mfr = 8 |
| PBT Poly(butylene terephthalate) | General Electric | Valox 6120 | | |
| PA6 Nylon 6 | Allied Signal | Capron 8253 | 1.09 | mp = 21° C. |
| ABS Acrylonitrile-Butadiene-Styrene Resin | Dow Chemical | Magnum 341 | 1.05 | mfr = 5 |
| PC/PBT Polycarbonate/ Poly(butylene terephthalate alloy | General Electric | Xenoy 1101 | 1.21 | |

TABLE XXXVIII

| | melt temperatures (°C.) | |
|---|---|---|
| | compounder | transition |
| PMMA | 225–235 | 210–220 |
| SAN | 220–230 | 210–220 |
| EVOH | 205–225 | 200–215 |
| PA66 | 260–275 | 255–270 |
| PET | 245–275 | 245–255 |
| PVC | 205–230 | 190–215 |
| PC | 250–290 | 240–270 |

The pellets were dried and injection molded on a reciprocating-screw injection molding machine (New Britain Model 75) into test specimens.

TABLE XXXIX

Effect of Compatibilizer on Polymer Tensile Strength
Tensile Strengths Shown in MegaPascals (MPa)

| | compatibilizer concentration | | |
|---|---|---|---|
| Polymer | 0 phr | 5 phr | 15 phr |
| PMMA | 65.44 | 64.79 | 61.27 |
| SAN | 71.91 | 62.74 | 55.89 |
| EVOH | 68.78 | 66.21 | 63.78 |
| PA66 | 64.82 | 64.68 | 66.60 |
| PET | 58.26 | 59.33 | 59.72 |
| PVC | 45.25 | 44.97 | 45.22 |
| PC | 62.63 | 63.05 | 63.70 |
| HDPE | 22.59 | 22.66 | 24.14 |
| PP | 33.02 | 34.03 | 33.95 |
| EP | 4.79 | 5.50 | 5.84 |
| LLDPE | 10.91 | 11.80 | 12.99 |
| EVA | 8.64 | 8.67 | 8.17 |

TABLE XL

Tensile Strengths (MPa) of Blends of Polyolefins and Polar Polymers

| polar polymer | 30% polar polymer 0 phr | 30% polar polymer 5 phr | 30% polar polymer 15 phr | 55% polar polymer 0 phr | 55% polar polymer 5 phr | 55% polar polymer 15 phr | 80% polar polymer 0 phr | 80% polar polymer 5 phr | 80% polar polymer 15 phr |
|---|---|---|---|---|---|---|---|---|---|
| HDPE | | | | | | | | | |
| *PMMA | 25.26 | 27.00 | 30.26 | 31.42 | 38.30 | 39.54 | 50.78 | 53.77 | 55.55 |
| *SAN | 25.77 | 28.09 | 30.57 | 34.71 | 41.51 | 38.33 | 51.88 | 55.08 | 51.23 |
| *EVOH | 26.57 | 26.80 | 27.74 | 33.18 | 38.00 | 39.58 | 49.24 | 51.32 | 50.79 |
| PA66 | 26.94 | 28.85 | 29.72 | 38.34 | 38.11 | 38.33 | 61.22 | 65.62 | 69.23 |
| PET | 25.97 | 28.61 | 30.98 | 37.70 | 37.93 | 40.09 | 50.23 | 51.72 | 50.91 |
| PVC | 20.89 | 22.92 | 24.86 | 19.91 | 23.67 | 27.34 | 26.18 | 30.72 | 34.87 |
| PC | 25.66 | 28.80 | 30.93 | 31.11 | 35.20 | 38.53 | 55.61 | 50.41 | 51.92 |
| PP | | | | | | | | | |
| *PMMA | 34.02 | 35.37 | 37.81 | 40.23 | 43.45 | 45.84 | 46.40 | 53.70 | 56.6 |
| *SAN | 33.67 | 38.76 | 41.05 | 37.67 | 47.65 | 46.08 | 41.11 | 54.12 | 51.81 |
| *EVOH | 32.85 | 37.40 | 38.56 | 35.01 | 44.65 | 45.60 | 42.73 | 53.38 | 52.57 |
| PA66 | 32.06 | 40.29 | 40.38 | 42.72 | 52.17 | 51.10 | 64.71 | 67.84 | 66.15 |
| PET | 32.93 | 33.80 | 35.15 | 39.47 | 43.81 | 43.64 | 37.67 | 53.12 | 54.04 |
| PVC | 36.32 | 37.68 | 39.35 | 35.28 | 37.87 | 40.79 | 30.88 | 40.00 | 42.56 |
| PC | 33.82 | 36.68 | 39.09 | 36.69 | 40.13 | 44.64 | 42.38 | 46.24 | 51.64 |
| EP | | | | | | | | | |
| PMMA | 8.20 | 10.87 | 12.51 | 19.99 | 24.17 | 27.81 | 42.47 | 44.59 | 46.93 |
| SAN | 8.10 | 12.53 | 14.11 | 22.14 | 28.82 | 28.15 | 45.92 | 50.68 | 44.58 |
| EVOH | 12.19 | 12.04 | 11.69 | 24.92 | 24.66 | 23.17 | 41.29 | 42.39 | 42.70 |
| PA66 | 13.04 | 13.04 | 12.36 | 27.62 | 27.98 | 26.33 | 40.87 | 48.77 | 43.48 |
| PET | 7.94 | 8.40 | 11.13 | 20.22 | 20.43 | 22.27 | 33.72 | 37.00 | 38.87 |
| PVC | 6.17 | 9.05 | 12.88 | 12.93 | 18.28 | 19.22 | 25.50 | 28.41 | 30.60 |
| PC | 10.31 | 12.05 | 13.66 | 23.10 | 24.34 | 25.60 | 40.18 | 41.79 | 42.76 |
| LLDPE | | | | | | | | | |
| PMMA | 15.23 | 18.63 | 20.90 | 24.88 | 30.68 | 32.84 | 48.95 | 55.36 | 54.14 |
| SAN | 15.78 | 21.08 | 22.57 | 26.50 | 35.76 | 36.71 | 47.52 | 56.92 | 48.84 |
| EVOH | 16.83 | 17.26 | 18.26 | 30.02 | 31.74 | 31.87 | 51.83 | 50.71 | 52.29 |
| PA66 | 17.93 | 17.99 | 19.98 | 29.67 | 28.49 | 25.23 | 64.65 | 67.55 | 67.26 |
| PET | 15.33 | 18.09 | 20.35 | 25.53 | 28.23 | 30.78 | 45.02 | 46.16 | 42.87 |
| PVC | 14.72 | 14.12 | 15.73 | 12.45 | 18.09 | 20.50 | 25.99 | 30.54 | 33.69 |
| PC | 13.64 | 19.20 | 18.48 | 19.22 | 27.83 | 30.46 | 38.45 | 40.59 | 38.86 |
| EVA | | | | | | | | | |
| PMMA | 10.57 | 11.28 | 14.38 | 23.06 | 21.10 | 28.31 | 45.99 | 47.02 | 50.87 |
| SAN | 12.40 | 13.62 | 15.22 | 27.97 | 27.29 | 29.35 | 48.94 | 52.01 | 46.14 |
| EVOH | 13.13 | 13.97 | 16.59 | 32.41 | 28.65 | 35.43 | 50.97 | 50.28 | 48.81 |
| PA66 | 14.15 | 13.54 | 14.42 | 27.36 | 24.59 | 26.92 | 40.75 | 38.35 | 31.60 |
| PET | 14.55 | 14.35 | 12.31 | 21.22 | 23.90 | 26.45 | 43.20 | 43.91 | 48.44 |
| PVC | 7.69 | 8.28 | 10.25 | 13.40 | 14.29 | 18.17 | 19.22 | 23.76 | 28.12 |
| PC | 14.05 | 14.54 | 13.52 | 19.78 | 21.79 | 24.85 | 39.26 | 40.55 | 41.46 |

*polar polymer levels are 20, 45, and 70% instead of 30, 55 and 80%.

TABLE XLI

Effect of Compatibilizer on Tensile Strength of Blends of Polyolefins and Polar Polymers Increase in Tensile Strength (MPa) from the Compatibilizer

| polar polymer | 30% polar polymer 5 phr | 30% polar polymer 15 phr | 55% polar polymer 5 phr | 55% polar polymer 15 phr | 80% polar polymer 5 phr | 80% polar polymer 15 phr |
|---|---|---|---|---|---|---|
| HDPE | | | | | | |
| PMMA | 1.74 | 5.01 | 7.38 | 8.12 | 2.99 | 4.77 |
| SAN | 2.32 | 4.80 | 6.80 | 3.63 | 3.21 | −0.64 |
| *EVOH | 0.23 | 1.17 | 4.81 | 6.39 | 2.08 | 1.54 |
| PA66 | 1.90 | 2.77 | −0.23 | −0.01 | 4.40 | 8.00 |
| PET | 2.65 | 5.01 | 0.23 | 2.39 | 1.48 | 0.68 |
| PVC | 2.03 | 3.97 | 3.76 | 7.43 | 4.54 | 8.69 |
| PC | 3.14 | 5.27 | 4.10 | 7.42 | −5.20 | −3.69 |
| PP | | | | | | |
| *PMMA | 1.35 | 3.79 | 3.22 | 5.61 | 7.29 | 10.22 |
| SAN | 5.09 | 7.38 | 9.98 | 8.41 | 13.02 | 10.70 |
| *EVOH | 4.56 | 5.72 | 9.64 | 10.59 | 10.65 | 9.83 |
| PA66 | 8.23 | 8.32 | 9.45 | 8.38 | 3.13 | 1.44 |
| PET | 0.86 | 2.22 | 4.34 | 4.17 | 15.44 | 16.37 |
| PVC | 1.36 | 3.03 | 2.59 | 5.51 | 9.11 | 11.68 |
| PC | 2.86 | 5.27 | 3.43 | 7.94 | 3.85 | 9.26 |
| EP | | | | | | |
| PMMA | 2.66 | 4.30 | 4.18 | 7.82 | 2.12 | 4.46 |
| SAN | 4.43 | 6.01 | 6.68 | 6.01 | 4.76 | −1.34 |
| EVOH | −0.15 | −0.50 | −0.27 | −1.75 | 1.10 | 1.41 |
| PA66 | 0.01 | −0.68 | 0.36 | −1.29 | 7.90 | 2.61 |
| PET | 0.46 | 3.19 | 0.21 | 2.05 | 3.29 | 5.16 |
| PVC | 2.86 | 6.71 | 5.35 | 6.29 | 2.91 | 5.10 |
| PC | 1.74 | 3.35 | 1.24 | 2.50 | 1.61 | 2.59 |
| LLDPE | | | | | | |
| PMMA | 3.40 | 5.67 | 5.80 | 7.96 | 6.42 | 5.19 |
| SAN | 5.31 | 6.80 | 9.26 | 10.21 | 9.40 | 1.32 |
| EVOH | 0.43 | 1.43 | 1.72 | 1.85 | −1.12 | 0.45 |
| PA66 | 0.06 | 2.05 | −1.19 | −4.44 | 2.90 | 2.61 |
| PET | 2.76 | 5.01 | 2.70 | 5.25 | 1.14 | −2.14 |
| PVC | −0.59 | 1.01 | 5.64 | 8.05 | 4.56 | 7.70 |
| PC | 5.56 | 4.85 | 8.61 | 11.24 | 2.14 | 0.41 |
| EVA | | | | | | |
| PMMA | 0.71 | 3.81 | −1.95 | 5.25 | 1.03 | 4.87 |
| SAN | 1.22 | 2.81 | −0.68 | 1.38 | 3.07 | −2.80 |
| EVOH | 0.83 | 3.45 | −3.75 | 3.02 | −0.68 | −2.16 |
| PA66 | −0.61 | 0.27 | −2.77 | −0.44 | −2.40 | −9.15 |
| PET | −0.20 | −2.25 | 2.68 | 5.23 | 0.70 | 5.24 |
| PVC | 0.59 | 2.56 | 0.89 | 4.76 | 4.54 | 8.89 |
| PC | 0.49 | −0.53 | 2.01 | 5.07 | 1.30 | 2.20 |

*polar polymer levels are 20, 45 and 70% instead of 30, 55 and 80%.

TABLE XLII

| Compatibilization Effect | | | | | |
|---|---|---|---|---|---|
| | HDPE | PP | EP | LLPDE | EVA |
| PMMA | +++ | +++[1] | +++ | +++ | +++ |
| SAN | +++ | +++ | +++ | +++ | ++ |

TABLE XLII-continued

| | Compatibilization Effect | | | | |
|---|---|---|---|---|---|
| | HDPE | PP | EP | LLPDE | EVA |
| EVOH | ++ | +++[1] | 0 | 0 | ++ |
| PA66 | ++ | +++[1] | + | + | 0 |
| PET | + | ++[1] | ++ | ++ | ++ |
| PVC | +++ | +++ | +++ | ++[1] | ++ |
| PC | ++ | +++[1] | + | ++ | + |

+++ - compatibilization at all three polyolefin-polar polymer ratios (not necessarily at all compatibilizer levels)
++ - compatibilization at two of the three polyolefin-polar polymer levels
+ - compatibilization at one of the two polyolefin-polar polymer levels
0 - no compatibilization seen at any polyolefin-polar polymer ratio, at any compatibilizer level
[1] additional evidence for compatibilization in the reduction of domain size by 10-80%

EXAMPLE 115

The compatibilizing effect on selected, additional polymer pairs was evaluated in the following example. The blends were compounded, molded and tested for tensile strength as previously described. The results in Table XLIII again indicate that the compatibilizer has minimal or a negative effect on the polar polymers, but a positive effect on the polar/nonpolar polymer blends. A large tensile strength improvement is seen for the ABS/PP blend. Smaller but significant improvements are seen for the blends of PP with PA6 and with PC/PBT. With the PS blends evaluated the effect was negligible.

TABLE XLIII

| | | tensile strengths (MPa) | | | |
|---|---|---|---|---|---|
| polar polymer | nonpolar polymer | polar polymer | polar polymer + 15 phr graft copolymer | blend[1] | blend[1] + 15 phr graft copolymer |
| PBT | PP | 43.02 | 45.11 | 36.96 | 38.96 |
| PA6 | PP | 56.11 | 51.67 | 43.50 | 47.04 |
| PS | PP | 45.26 | 40.45 | 38.88 | 37.36 |
| PS | HDPE | 45.26 | 40.45 | 36.48 | 33.76 |
| ABS | PP | 51.25 | 52.25 | 32.25 | 42.55 |
| PC/PBT | PP | 51.77 | 51.79 | 38.99 | 41.88 |

[1] blend in all cases refers to 55 parts by weight polar polymer and 45 parts by weight nonpolar polymer.

The effect of the graft copolymer on multi-component blends such as those representative of commingled scrap polymers are shown in Table XLIV. In all cases a significant increase in tensile strength is observed when the compatibilizer is present.

TABLE XLIV

| Compatibilization of Multicomponent Blends | | | | | | | |
|---|---|---|---|---|---|---|---|
| Polar Polymers | | | Nonpolar Polymers | | | Compatibilizer | Tensile Strength (MPa) |
| PS | PET | PVC | HDPE | LLDPE | PP | | |
| 12 | 7 | 5 | 33.5 | 33.5 | 9 | none | 16.27 |
| 12 | 7 | 5 | 33.5 | 33.5 | 9 | 5 | 17.67 |
| 12 | 7 | 5 | 33.5 | 33.5 | 9 | 15 | 21.77 |
| 12 | 8 | — | 35 | 35 | 10 | none | 18.62 |
| 12 | 8 | — | 35 | 35 | 10 | 5 | 19.98 |
| 12 | 8 | — | 35 | 35 | 10 | 15 | 22.16 |
| 12 | — | 6 | 36 | 36 | 10 | none | 17.06 |
| 12 | — | 6 | 36 | 36 | 10 | 5 | 19.21 |
| 12 | — | 6 | 36 | 36 | 10 | 15 | 21.91 |

EXAMPLE 116

This example further illustrates compatibilization of polymer blends using graft copolymers of the present invention.

Blends of ethylene-vinyl alcohol copolymer (Kuraray EP-F101A), polypropylene (Himont 6523) and graft copolymer were milled on a 7.62-cm × 17.78-cm electric mill at 204° C. to flux plus three minutes. The stocks were pressed at 204° C. and 103 MPa for three minutes (Carver Press, 12.7-cm × 12.7-cm × 3.175-mm mold) and at room temperature and 103 MPa for three minutes. Two graft copolymers were used in this example. The first (Graft Copolymer A) was a polypropylene-acrylic graft copolymer prepared from mfr=4 polypropylene homopolymer (100 parts) and a 93:2:5 mixture of methyl methacrylate:ethyl acrylate:methacrylic acid (100 parts). Polymerization was done in Isopar E solvent at 160° C. at 50% solids over one hour with a di-t-butyl peroxide radical flux of 0.00012. The product isolated contained 44% acrylate. The second graft copolymer (Graft Copolymer B) was a polypropylene-acrylic graft copolymer prepared from mfr=4 propylene homopolymer (100 parts) and a 95:5 mixture of methyl methacrylate:ethyl acrylate (150 parts). Polymerization was done in Isopar E solvent at 155° C. at 60% solids. The feed time was 60 minutes and the radical flux was 0.00010. The product contained 53% acrylate. Addition of the graft copolymer results in an increase in tensile strength and modulus.

TABLE XLV

| Compatibilzation of EVOH and Polypropylene | | | | | |
|---|---|---|---|---|---|
| EVAL (grams) | PP (grams) | graft copolymer (grams) | notched Izod tensile (J/m) | tensile strength (MPa) | tensile modulus (MPa) |
| 90 | 30 | 0 | 21 | 29.85 | 2570 |
| 90 | 25 | 5[1] | 21 | 48.06 | 3190 |
| 90 | 25 | 5[2] | 22 | 46.75 | 3270 |
| 30 | 90 | 0 | 18 | 21.37 | 1930 |
| 30 | 75 | 15[1] | 18 | 29.79 | 2140 |
| 30 | 75 | 15[2] | 13 | 30.41 | 2030 |

1 - Graft Copolymer A (see text above).
2 - Graft Copolymer B (see test above).

While the invention has been described with reference to specific examples and applications, other modifications and uses for the invention will be apparent to those skilled in the art without departing from the spirit and scope of the invention defined in the appended claims.

What is claimed is:

1. A graft copolymer capable of imparting to a polyolefin when blended therewith a relatively high tensile modulus and high resistance to sagging without increasing melt viscosity, the copolymer comprising:
(a) a non-polar polyolefin trunk selected from the group consisting of polyethylene, polypropylene, polybutylene, poly(4-methylpentene), copolymers of said olefins with each other, and one or more copolymers of said olefins with minor amounts of 1-alkenes, vinyl esters, vinyl chloride, (meth)acrylic ester, and (meth)acrylic acid, said trunk having a Mw of between about 50,000 and 1,000,000; and
(b) at least one methacrylate chain grafted with a covalent bond to said trunk having a weight ratio with said trunk of from about 1:9 to about 4:1, said chain being a polymer derived from at least about 80% of a monomer of a methacrylic ester of the formula $CH_2=C(CH_3)COOR$, where R is alkyl, aryl, substituted alkyl, substituted aryl, or substituted alkaryl, and less than about 20% of an acrylic or styrenic monomer copolymerizable with the methacrylic ester, said chain having a Mw of from about 20,000 to 200,000.

2. A copolymer as claimed in claim 1 wherein the weight average molecular weight of the methacrylate chain is between about 30,000 and 150,000.

3. A copolymer as claimed in claim 1 wherein the molecular weight of the trunk is about 100,000 to 400,000.

4. A copolymer as claimed in claims 1, 3 or 5 wherein the methacrylic ester is methyl methacrylate.

5. A copolymer as claimed in claims 1, 3 or 5 wherein the polyolefin trunk is polypropylene.

6. A copolymer as claimed in claims 1, 3 or 5 wherein the polyolefin trunk is polypropylene and the methacrylate chain is a methyl methacrylate polymer.

7. The graft copolymer of claim 1 wherein the substituted alkyl group is alkylthioalkyl.

8. The graft copolymer of claim 7 wherein the alkylthioalkyl group is ethylthioethyl.

* * * * *

UNITED STATES PATENT AND TRADEMARK OFFICE
CERTIFICATE OF CORRECTION

PATENT NO. : 4,957,974
DATED : September 18, 1990
INVENTOR(S) : Ilenda et al.

It is certified that error appears in the above-identified patent and that said Letters Patent is hereby corrected as shown below:

Claim 4 should be dependent on claims 1, 2 or 3.

Claim 5 should be dependent on claims 1, 2 or 3.
Claim 6 should be dependent on claims 1, 2 or 3

Signed and Sealed this

Fifteenth Day of September, 1992

Attest:

DOUGLAS B. COMER

Attesting Officer

Acting Commissioner of Patents and Trademarks